United States Patent [19]

Umakoshi

[11] Patent Number: 5,223,951
[45] Date of Patent: Jun. 29, 1993

[54] METHOD OF AND APPARATUS FOR ELIMINATING FALSE IMAGE

[75] Inventor: Shoichi Umakoshi, Kyoto, Japan

[73] Assignee: Dainippon Screen Mfg. Co., Ltd., Kyoto, Japan

[21] Appl. No.: 582,042

[22] Filed: Sep. 13, 1990

[30] Foreign Application Priority Data

Sep. 25, 1989 [JP] Japan .................. 1-249963

[51] Int. Cl.$^5$ .............................................. H04N 1/40
[52] U.S. Cl. ................................. 358/447; 358/463; 358/406
[58] Field of Search .................. 382/54; 358/106, 447, 358/463, 167, 905, 406

[56] References Cited

U.S. PATENT DOCUMENTS

| | | | |
|---|---|---|---|
| 4,649,436 | 3/1987 | Nakagawa et al. | 358/463 |
| 4,751,377 | 6/1988 | Ishizaka | 358/406 |
| 4,779,106 | 10/1988 | Mills | 358/406 |
| 4,802,093 | 1/1989 | Ema | 382/54 |
| 4,860,116 | 8/1989 | Nakajima | 358/447 |
| 4,896,222 | 1/1990 | Fukai | 358/447 |
| 4,897,724 | 1/1990 | Veldhuis | 358/106 |
| 4,912,557 | 3/1990 | Faroudja | 358/167 |
| 4,926,361 | 5/1990 | Ohtsubo et al. | 358/167 |
| 4,951,137 | 8/1990 | Kisou et al. | 358/167 |
| 4,958,374 | 9/1990 | Tokita et al. | 358/106 |
| 4,965,679 | 10/1990 | Morton et al. | 358/447 |
| 5,089,892 | 2/1992 | Koguchi et al. | 350/167 |

Primary Examiner—Edward L. Coles, Sr.
Assistant Examiner—Thomas L. Stoll
Attorney, Agent, or Firm—Lowe, Price, LeBlanc & Becker

[57] ABSTRACT

A reference original having a reference image is prepared and photoelectrically read with an image reader. The image thus obtained includes a true image and a false image which is called as a ghost or a flare. The relationship between the true image and the false image is detected. Then, an objective image to be reproduced is photoelectrically read with the image reader. The image thus obtained has a true image and a false image of an objective. The false image is eliminated using the relationship detected for the reference original.

23 Claims, 18 Drawing Sheets

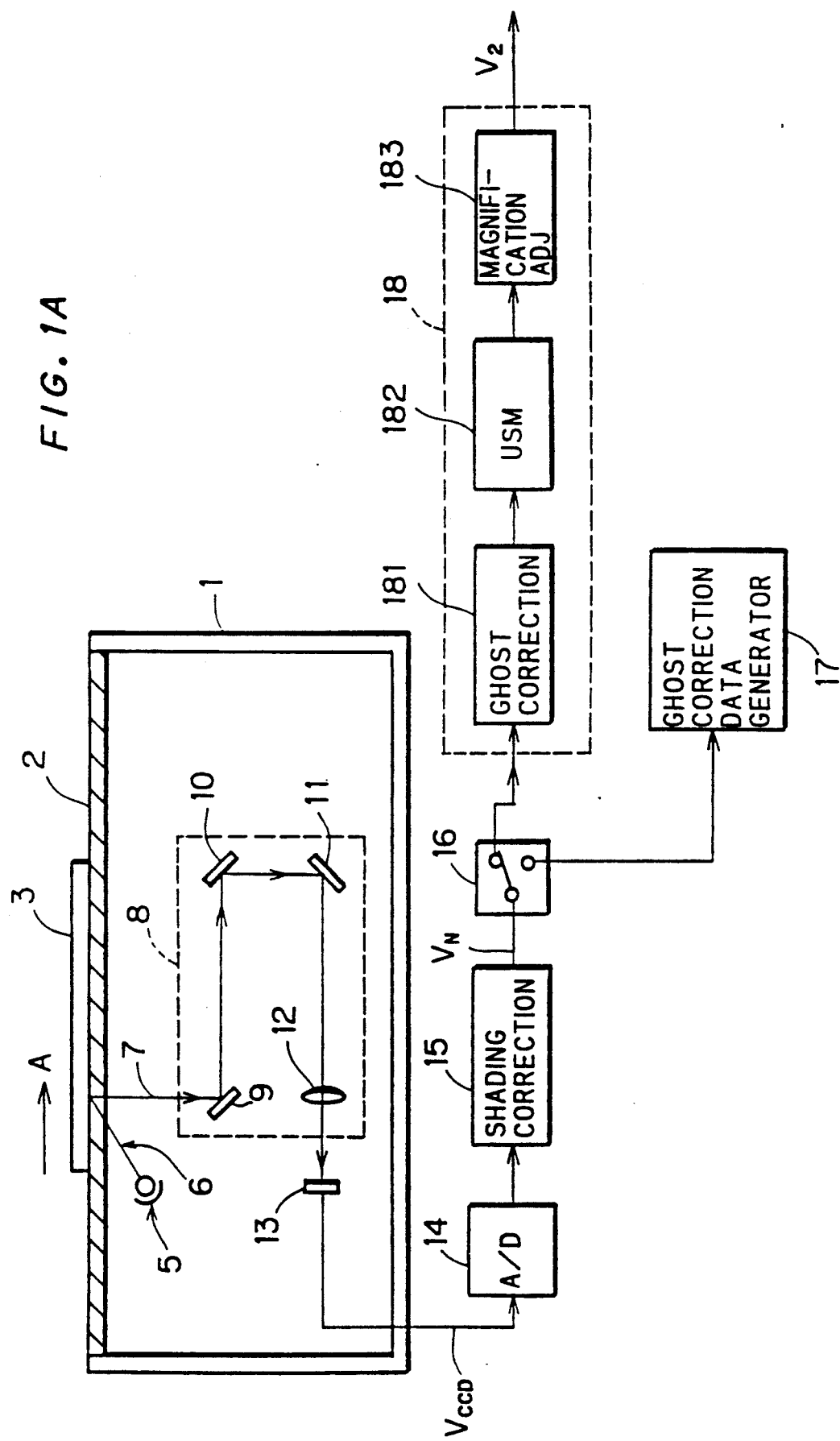

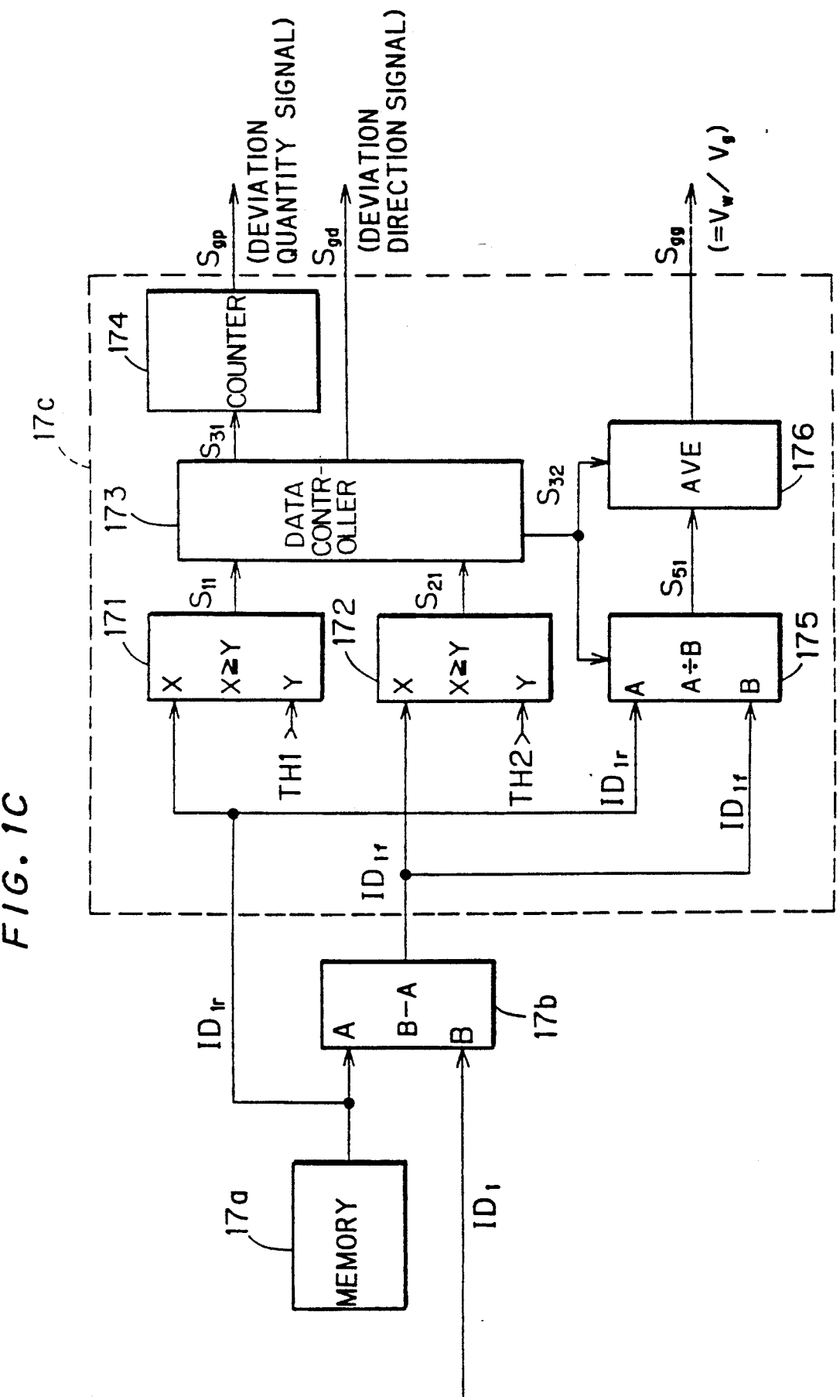

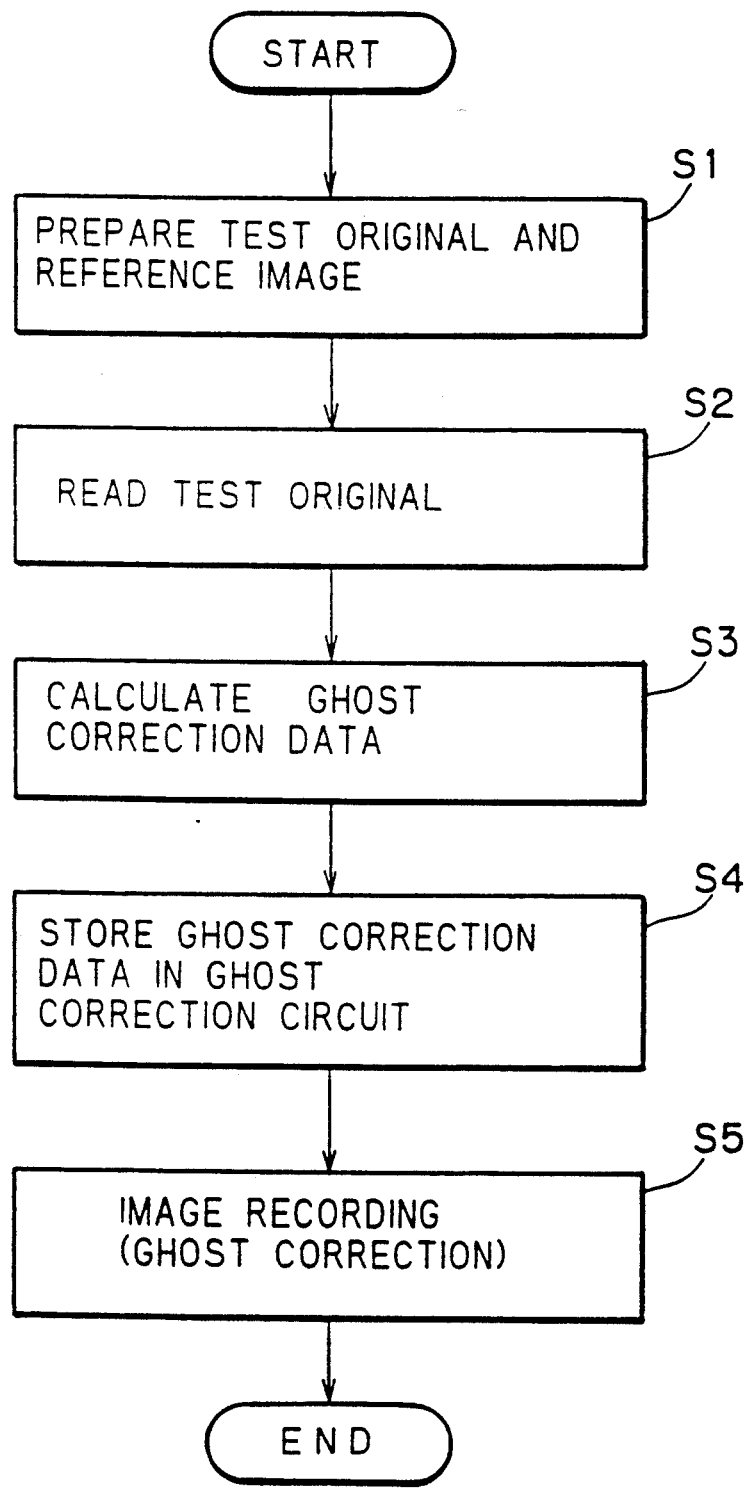

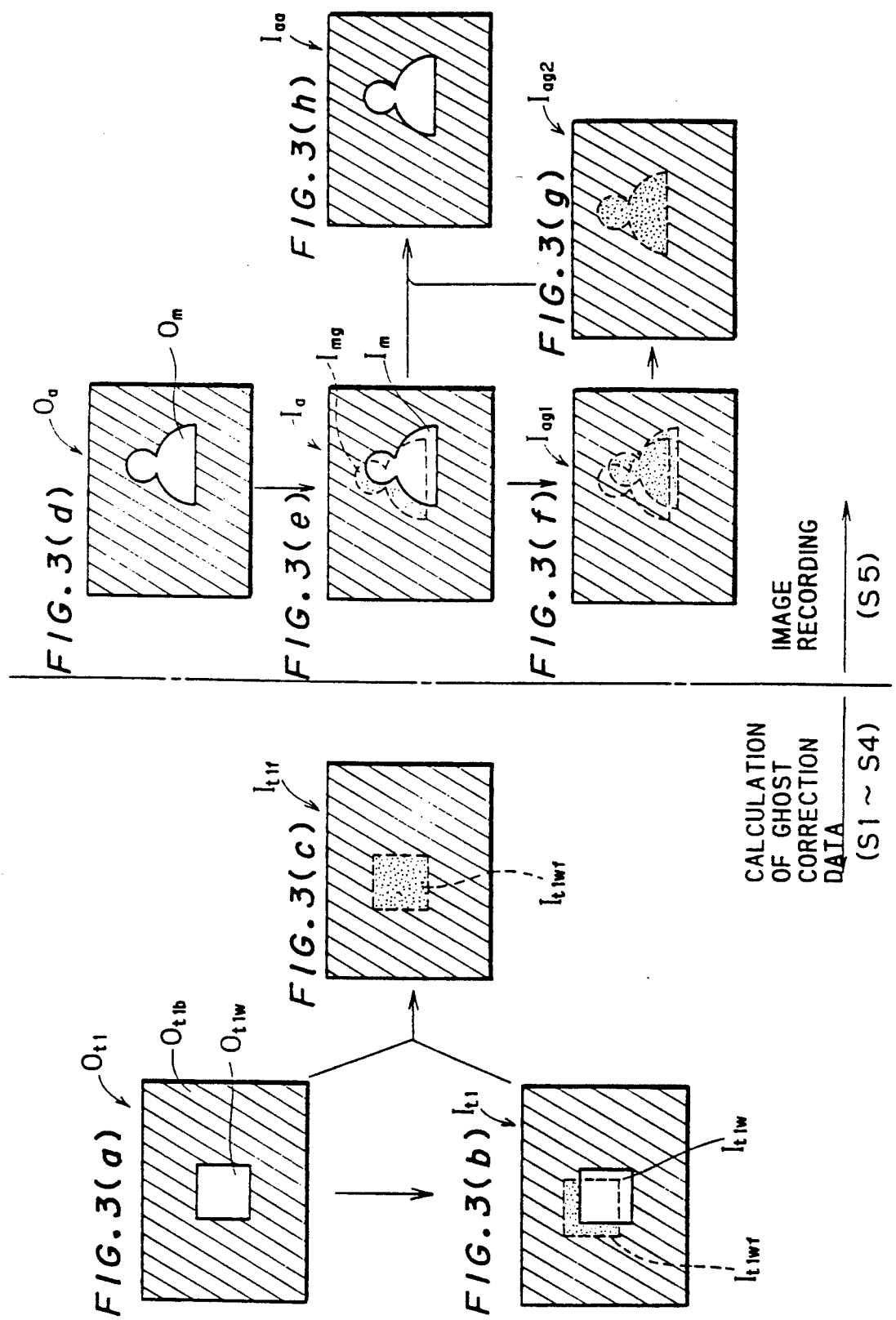

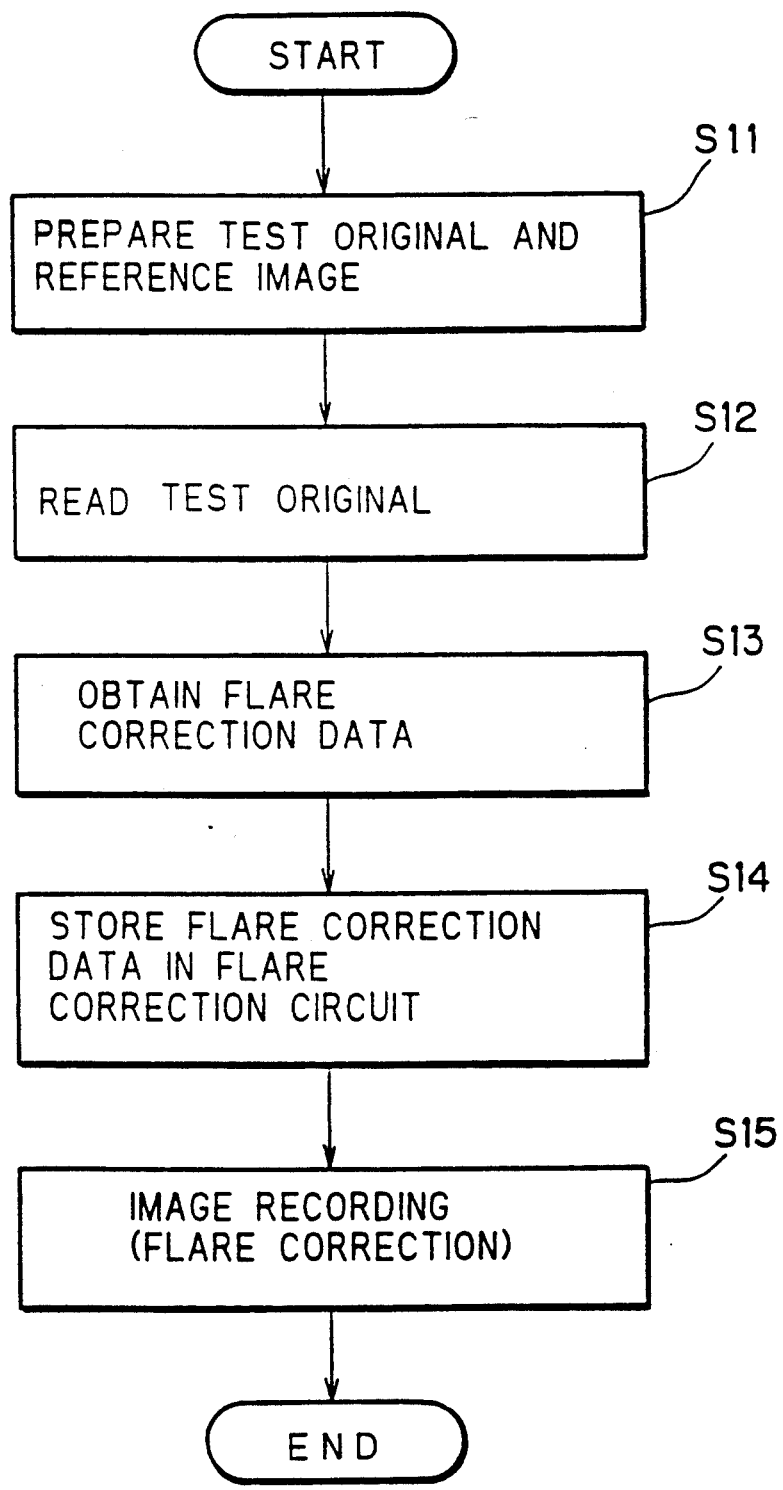

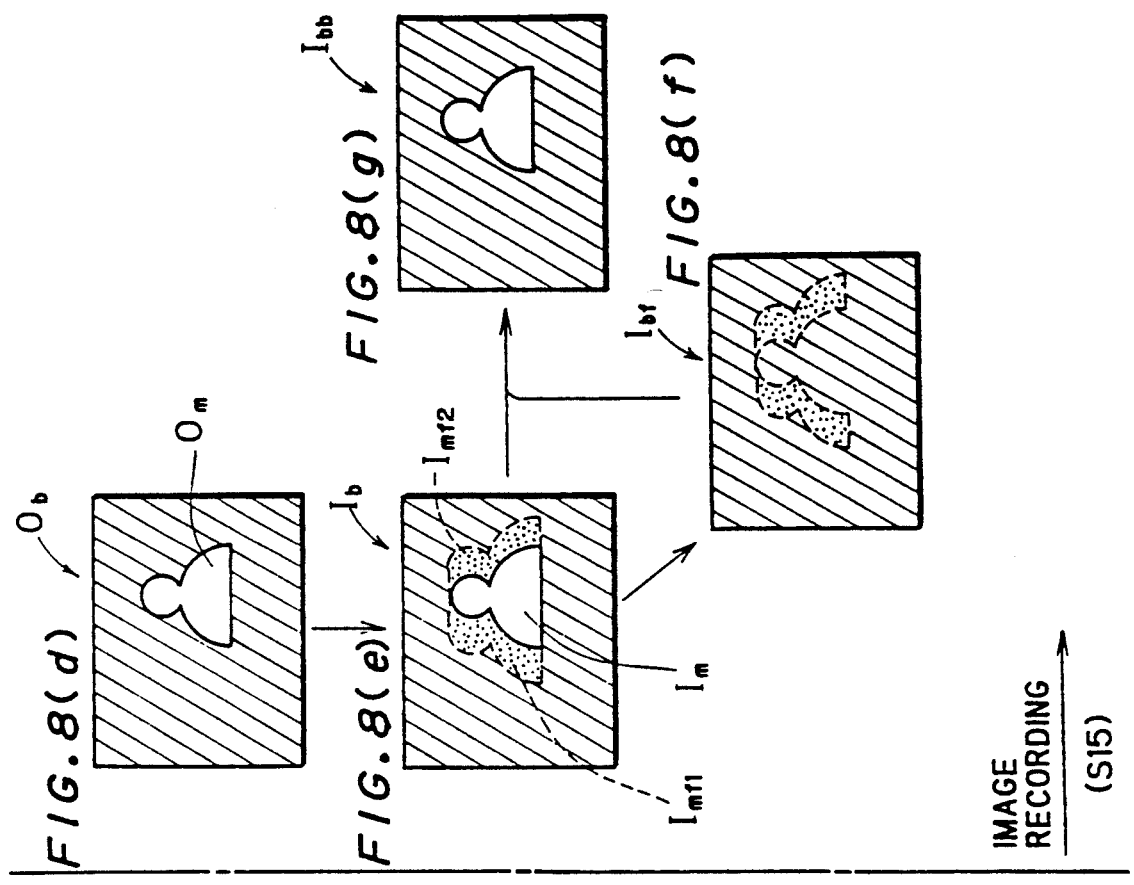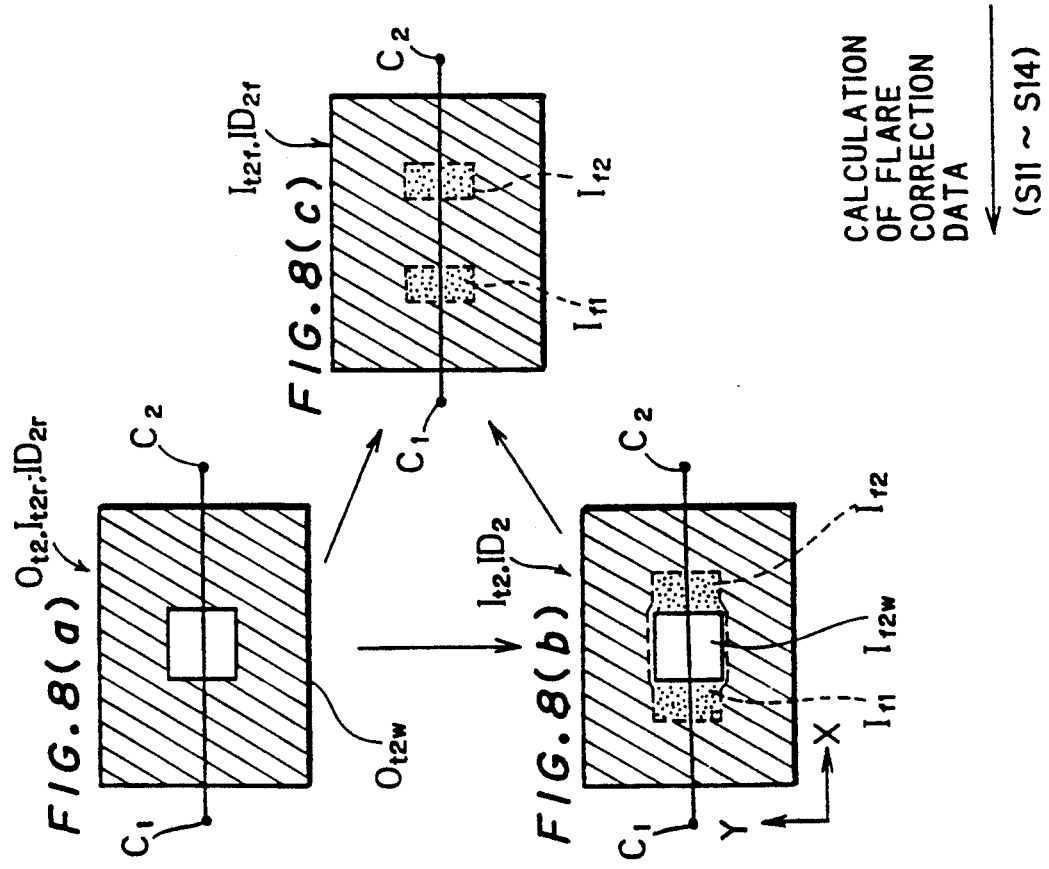

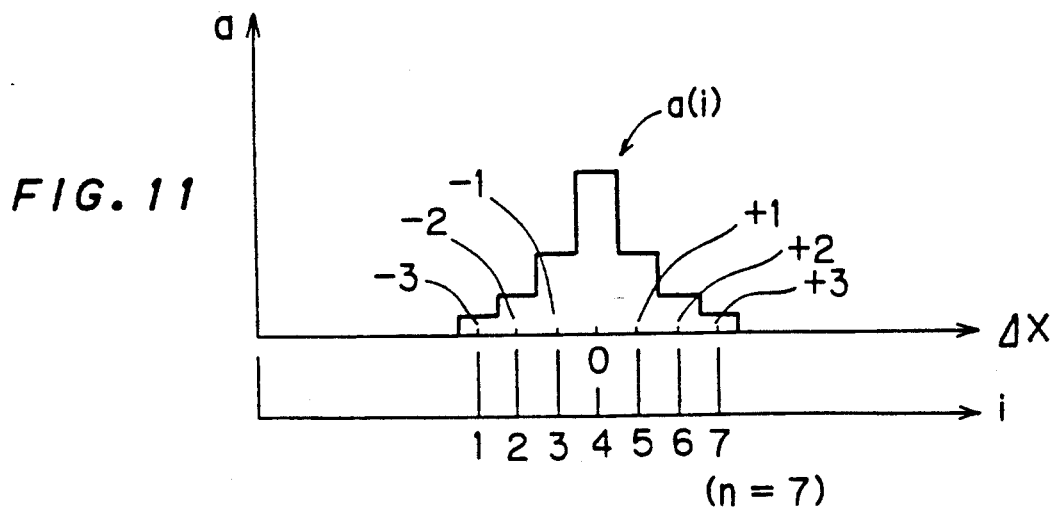
FIG. 11
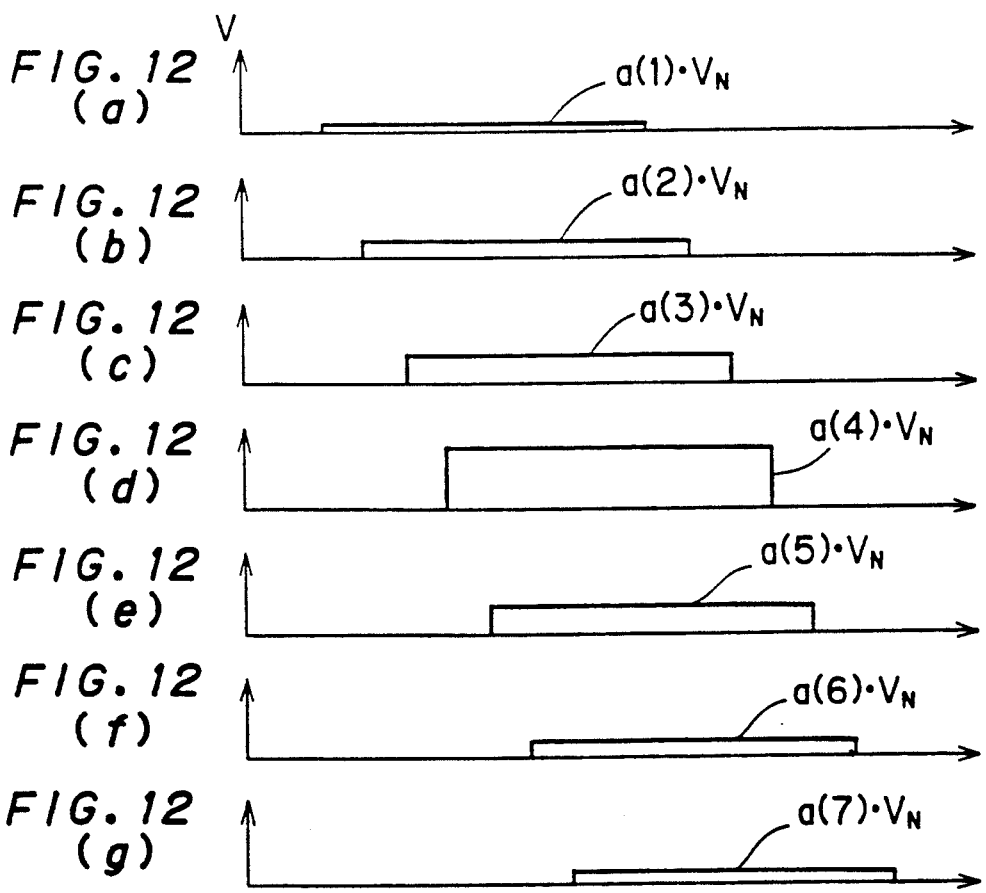
FIG. 12 (a)
FIG. 12 (b)
FIG. 12 (c)
FIG. 12 (d)
FIG. 12 (e)
FIG. 12 (f)
FIG. 12 (g)
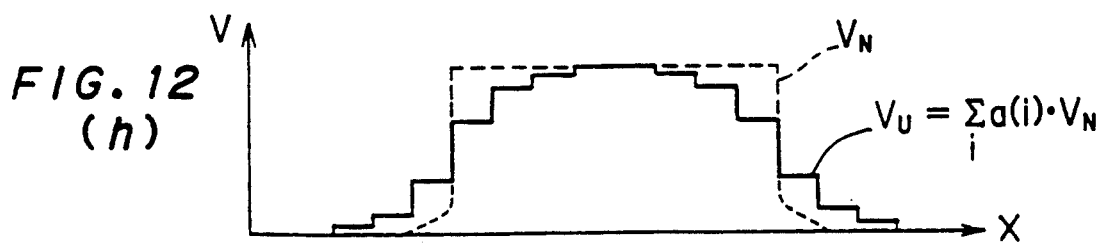
FIG. 12 (h)

METHOD OF AND APPARATUS FOR ELIMINATING FALSE IMAGE

BACKGROUND OF THE INVENTION

1. Field of the Invention

The present invention relates to a method of and an apparatus for eliminating a false image or pseudo-image from an image obtained through an image reader.

2. Description of Background Art

When an original is photoelectrically read through an image reader using a solid-state image pickup device such as a CCD image sensor, the image signal may include a false image called a flare or a ghost. It is known that the false image is caused by the structure of an optical system including the solid-state image pickup device. Such a false image can be eliminated to some extent by adjusting the optical system.

However, it is difficult to completely eliminate the false image by merely adjusting the optical system, and a residual false image, which cannot be eliminated, causes reduction of image quality. Therefore, it has been desired to develop a technique to fully eliminate the false image in image readers, particularly in image readers requiring high accuracy.

SUMMARY OF THE INVENTION

The present invention is directed to a method of eliminating, from an image obtained by photoelectrically reading an original on which an object is represented, a false image having the same shape as a true image of the object and appearing at a position deviating from the true image.

According to the present invention, the method comprises the steps of: (a) preparing a reference original having thereon a reference image which includes only a true image of a reference object having a predetermined shape and a predetermined optical level; (b) photoelectrically reading the reference original with an image reader to obtain a first image including the true image of the reference object and a false image of the reference object; (c) calculating a difference between the first image and the reference image to obtain a second image including only the false image of the reference object; (d) comparing the second image with the reference image to obtain a positional deviation and an optical level ratio between the second image and the reference image; (e) photoelectrically reading, with the image reader, an objective original having thereon only a true image of an object to obtain a third image including the true image of the object and a false image of the object; (f) providing to the third image the positional deviation and an optical density reduction corresponding to the optical level ratio to thereby obtain a fourth image substantially including only the false image of the object; and (g) subtracting the fourth image from the third image to eliminate the false image of the object from the third image to thereby obtain a fifth image which substantially includes only the true image of the object.

The method may be conducted by the apparatus comprising: (a) means for storing a reference image which includes only a true image of a reference object having a predetermined shape and a predetermined optical level; (b) means for imputting a first image which is obtained by photoelectrically reading a reference original having the reference image thereon and which includes the ture image of the reference object and a false image of the reference object; (c) means for calculating a difference between the first image and the reference image to obtain a second image including only the false image of the reference object; (d) means for comparing the second image with the reference image to obtain a positional deviation and an optical level ratio between the second image and the reference image; (e) means for inputting a third image which is obtained by phtoelectrically reading an objective original having thereon only a true image of an object and which includes the true image of the object and a false image of the object; (f) means for providing to the third image the positional deviation and an optical density reduction corresponding to the optical level ratio to thereby obtain a fourth image substantially including only the false image of the object; and (g) means for substracting the fourth image from the third image to eliminate the false image of object from the third image to thereby obtain a fifth image which substantially includes only the true image of the object.

The false image which is eliminated in the above-indicated structure is generally called a ghost. This false image appears as an image which has the same shape as the true image and positionally deviates from the true image. Thus, positional relation and the optical level ratio between the true image and the false image are previously obtained using the reference original. When the third image is obtained by reading an objective original, it is possible to obtain a false image included in the third image using the information representing the positional deviation and the optical level ratio between the ture image and the false image of the reference image and eliminate the same.

In an aspect of the present invention, provided is a method of eliminating, from an image obtained by photoelectrically reading an original on which an object is represented, a false image appearing around a true image of the object. The method comprises the steps of: (a) preparing a reference original having thereon a reference image which includes only a true image of a reference object having a predetermined shape and a predetermined optical level; (b) photoelectrically reading the reference original with an image reader to obtain a first image including the true image of the reference object and a false image of the reference object; (c) calculating a difference between the first image and the reference image to obtain a second image including only the false image of the reference object; (d) obtaining a conversion rule between an optical level distribution on the true image of the reference object and an optical level distribution on the false image included in the second image; (e) photoelectrically reading, with the image reader, an objective original having thereon only a true image of an object to obtain a third image including the true image of the object and a false image of the object; (f) applying the conversion rule to an opical level distribution on the third image to thereby convert the third image into a fourth image substantially including only the false image of the object; and (g) subtracting the fourth image from the third image to eliminate the false image of the object from the third image to thereby obtain a fifth image which substantially includes only the ture image of the object.

The method may be conducted by the apparatus comprising: (a) means for storing a reference image which includes only a true image of a reference object having a predetermined shape and a predetermined optical level; (b) means for inputting a first image which is obtained by photoelectrically reading a reference original having the reference image thereon and which includes the ture image of the reference object and a false image of the reference object; (c) means for calculating a difference between the first image and the reference image to obtain a second image including only the false image of the reference object; (d) means for obtaining such conversion rule that an optical level distribution on the false image included in the second image can be obtained by converting an optical level distribution on the true image of the reference object through the conversion rule; (e) means for inputting a third image which is obtained by phtoelectrically reading an objective original having thereon only a true image of an object and which includes the true image of the object and a false image of the object; (f) means for converting optical level distribution on the third image through the conversion rule to thereby obtain the third image into a fourth image substantially including only the false image of the object; and (g) means for subtracting the fourth image from the third image to eliminte the false image of the object from the third image to therby obtain a fifth image which substantially includes only the true image of the object.

The false image which is eliminated through this method is generally called a flare. This false image appears around the true image. Thus, the relation between the optical level distribution of the true image and the optical level distribution of the false image is detected using the reference original, and the conversion rule for obtaining the false image from the true image of a reference image is generated on the basis of the above-indicated relation. When the third image is obtained by reading an objective original, it is possible to obtain a false image included in the third image by using the conversion rule and eliminate the same.

Accordingly, an object of the present invention is to provide a method of and an apparatus for effectively eliminating a false image from an image obtained by reading an original with a photoelectric image reader.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 1A to 1C are block diagrams showing the structure of an apparatus according to a first preferred embodiment of the present invention, which is directed to ghost elimination, FIG. 2 is a flow chart showing the procedure of the first preferred embodiment, FIGS. 3(a)–3(h) illustrate exemplary images in the first preferred embodiment, FIG. 7 is a flow chart showing the procedure of the second preferred embodiment, FIGS. 8(a)–8(g) illustrate exemplary images in the second preferred embodiment, FIG. 11 is a diagram showing distribution of weight coefficients in the second preferred embodiment, and FIGS. 12(a)–12(h) are diagrams showing a method of generating a unsharp signal in the second preferred embodiment.

DESCRIPTION OF PREFERRED EMBODIMENTS

A. Ghost Correction

A-1. Entire Structure and Schematic Operation of Apparatus

Figure 1A:
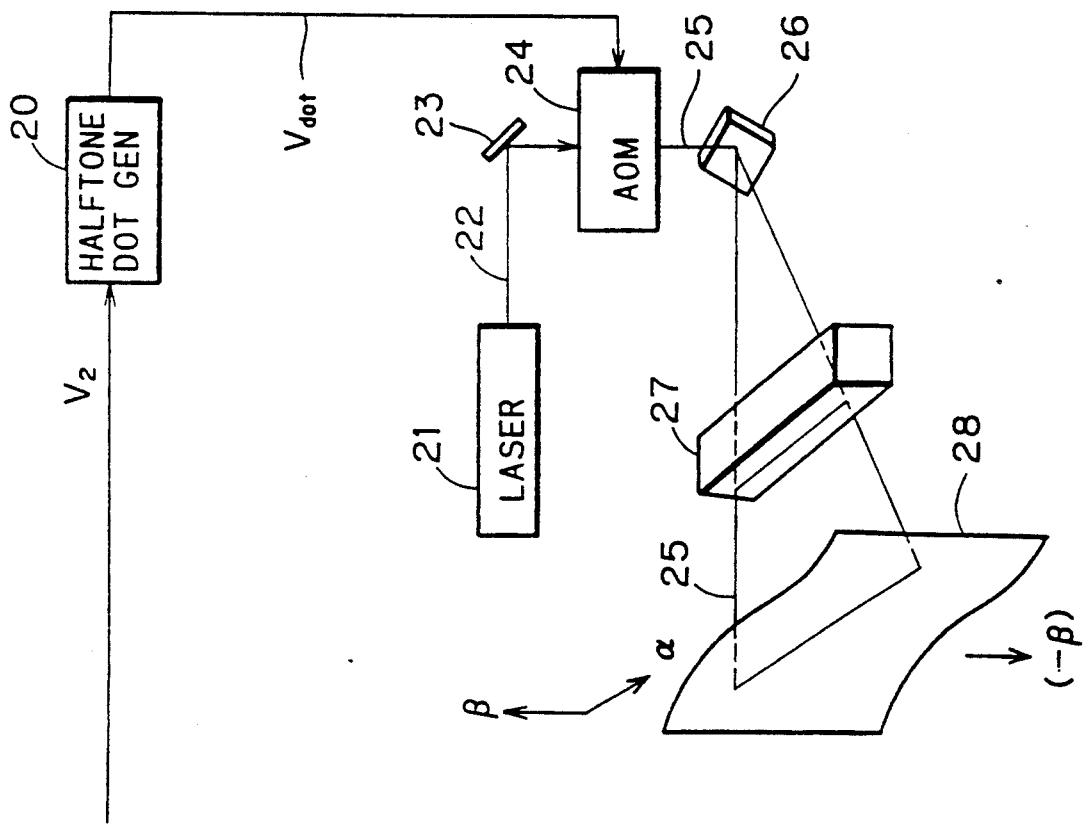

FIG. 1A is a schematic block diagram of a scanning apparatus for eliminating a false image (ghost) according to a first preferred embodiment of the present invention. A transparent glass plate 2 is provided on an upper opening of an outer frame 1 in this apparatus, and an original 3 is placed on the original glass plate 2 in a downwardly directed state. Illumination light 6 from a light source 5, which is formed by a halogen lamp or the like, is reflected by the surface of the original 3, and turned into light 7 including image information. This reflected light 7 is successively reflected by first to third mirrors 9 to 11 which are included in an optical system 8, and thereafter forms an image on a photo-receiving plane of a CCD line sensor 13 serving as photoelectric conversion means.

This CCD line sensor 13 is formed by CCD elements which are one-dimensionally arranged in a direction perpendicular to the illustration plane of FIG. 1A. Thus, the direction perpendicular to the plane of FIG. 1A is the main scanning direction.

The light forming the image on the photo-receiving plane of the CCD line sensor 13 is photoelectrically converted by the CCD line sensor 13 into an image signal $V_{CCD}$ for each pixel. This image signal $V_{CCD}$ is digitalized by an A-D converter 14 for each pixel, and successively supplied to a shading correction circuit 15. The shading correction circuit 15 is adapted to correct nonuniformity of illumination on the surface of the original 3, nonuniformity of image forming function of optical system 8, and nonuniformity in sensitivity of the respective CCD elements forming the CCD line sensor 13.

An image signal $V_N$ obtained through the shading correction is selectively supplied to one of a ghost correction data generating circuit 17 and an image processing circuit 18 through a switching circuit 16.

The image processing circuit 18 comprises a ghost correction circuit 181, an unsharp masking circuit 182 and a magnification adjusting circuit 183.

Figure 1B:
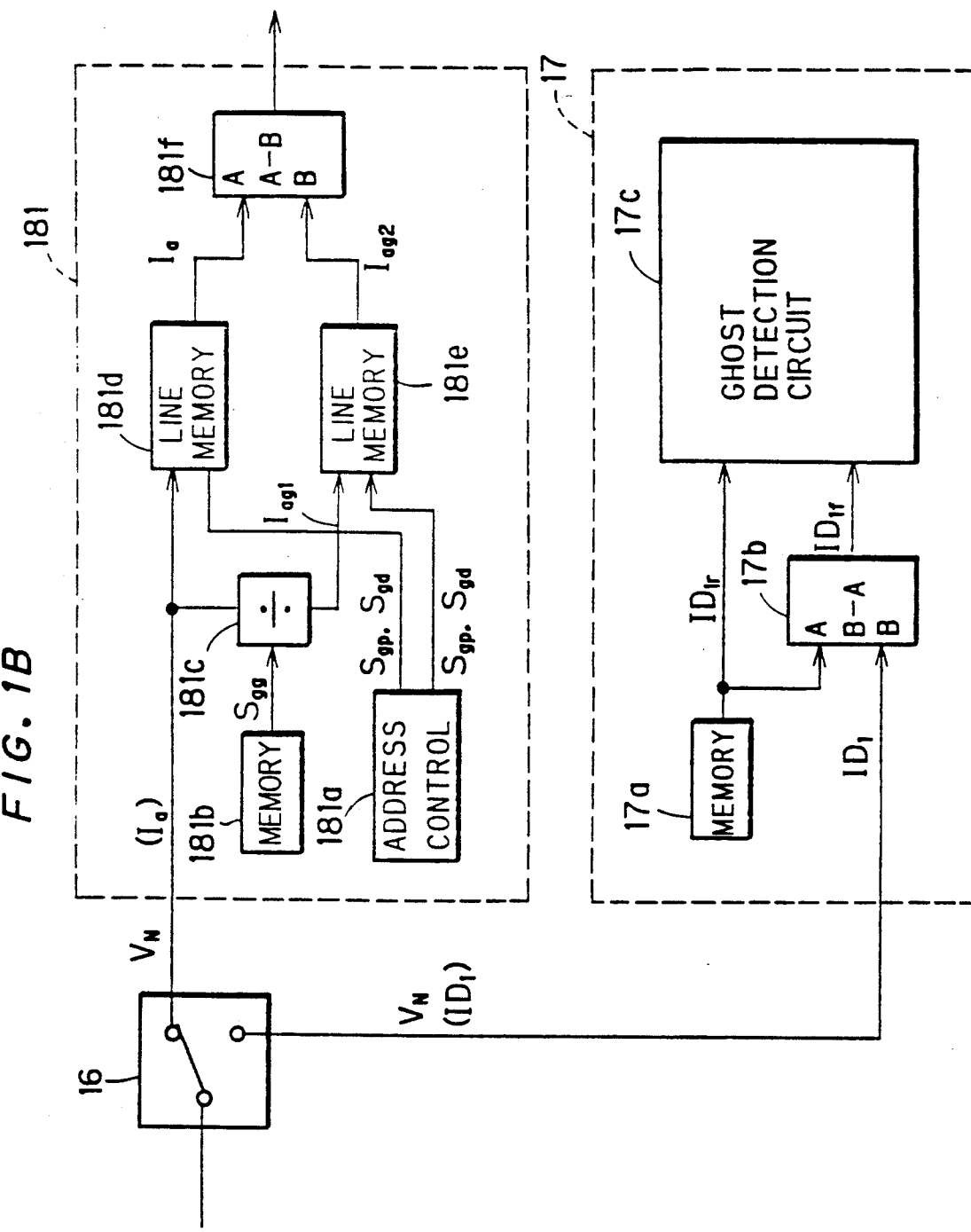

FIG. 1B is a block diagram showing internal structures of the ghost correction circuit 181 and the ghost correction data generating circuit 17.

The ghost correction data generating circuit 17 comprises a memory 17a for storing image data (reference image data) of a prescribed test original (reference original), a subtracter 17b, and a ghost detection circuit 17c. Ghost correction data generated in the ghost correction data generating circuit 17 are inputted and stored in the ghost correction circuit 181 through an on-line or off-line communication therebetween. The internal structure of the ghost correction circuit 181 is described later.

The image signal $V_N$, which is obtained upon reading of the original 3 to be reproduced is supplied to the image processing circuit 18, and subjected to processes including ghost correction, unsharp masking (sharpness enhancement processing), magnification adjustment and the like. An image signal $V_2$ thus obtained is outputted to a halftone dot signal generator 20. A halftone dot signal $V_{dot}$ from the halftone dot generator 20 becomes a modulation control signal of an acousto-optical modulator 24.

A laser beam 22 from a laser source 21 is supplied to the acousto-optical modulator 24 through a mirror 23. This acousto-optical modulator 24 modulates the laser beam 22 on the basis of the aforementioned halftone dot signal $V_{dot}$ and supplies an exposure beam 25. This exposure beam 25 is horizontally deflected by periodical vibration of a galvano mirror 26, and applied onto the surface of a photosensitive film 28 for recording a latent image thereon through a scanning optical system 27 which is formed by an $f\theta$ lens and the like. The galvano mirror 26 is vibrated in synchronization with output timing of the CCD elements in the CCD line sensor 13, whereby optical scanning in the main scanning direction $\alpha$ is achieved.

On the other hand, the light source 5 and the first mirror 9 are fixed to a mechanism (not shown) for relatively translating the same in a direction A shown in FIG. 1A with respect to the original 3, thereby optically scanning the original 3 in the direction A. In synchronization with the translation, the photosensitive film 28 is also moved in a downward direction $(-\beta)$ of FIG. 1A, thereby achieving subscanning in the direction A for reading an image and subscanning in the direction $\beta$ shown in FIG. 1A for recording an image.

A-2. Procedure of Ghost Correction

FIG. 2 is a flow chart showing the procedure of ghost correction. FIGS. 3(a)-3(h) are conceptual diagrams showing exemplary images in this procedure.

Referring to FIG. 2, a test original is prepared at a step S1. An exemplary test original $O_{t1}$ is shown at FIG. 3(a). This test original $O_{t1}$ has thereon a test image or a reference image consisting of a black part $O_{t1b}$ and a square white part $O_{t1w}$ which is arranged in the black part $O_{t1b}$. The shape, position and optical density of the white part $O_{t1w}$ and the optical density of the black part $O_{t1b}$ are measured using a densitometer and other measuring instruments. From the results of the measurement, an image having only a ture image of the test image and having no false image of the white part $O_{t1w}$ is obtained as a reference image with an electric image generator, and stored in the memory 17a provided in the ghost correction data generating circuit 17.

Then, the test original $O_{t1}$ is photoelectrically read at a step S2. At this time, the switching circuit 16 shown in FIG. 1A is switched toward the ghost correction data generating circuit 17, whereby the image signal $V_N$ is supplied from the shading correction circuit 15 to the ghost correction data generating circuit 17. An image $I_{t1}$ represented by the signal $V_N$ is shown at FIG. 3(b). This image $I_{t1}$ includes a true image $I_{t1w}$ and a false image $I_{t1wf}$ of the white part $O_{t1w}$ in the test original $O_{t1}$. The false image $I_{t1wf}$ is shown by broken lines in FIG. 3(b). This false image $I_{t1wf}$ is generally called a ghost, which has the same shape as the true image $I_{t1w}$ and slightly higher optical density (or slightly lower luminance), and appears in a position deviating from the true image $I_{t1w}$.

At a step S3, the ghost correction data generating circuit 17 generates ghost correction data on the basis of the image $I_{t1}$. At this time, only the false image $I_{t1wf}$ is first separated from the image $I_{t1}$, as shown at FIG. 3(c). Then, the position and density (or luminance) of the false image $I_{t1wf}$ are compared with the position and density (or luminance) of the white part $O_{t1w}$ of the test original $O_{t1}$. Ghost correction data are generated from the results.

Figure 4A:
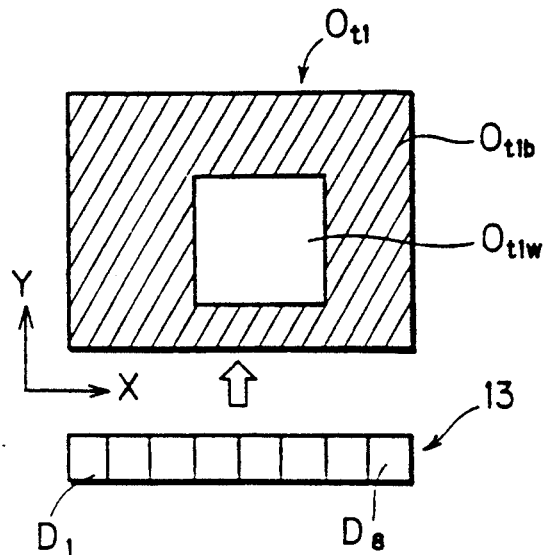
FIGS. 4A to 4F are diagrams showing a method of obtaining a false image in the first preferred embodiment.

FIGS. 4A to 4F are explanatory diagrams showing the manner of obtaining image data of the false image $I_{t1wf}$. FIG. 4A schematically shows a state of the CCD line sensor 13 scanning the test original $O_{t1}$. Referring to FIGS. 4A to 4F, the white part $O_{t1w}$ is shown in an enlarged manner for convenience of illustration. Further, the CCD line sensor 13 is assumed to have eight CCD elements $D_1$ to $D_8$, for the purpose of simplification. In this case, the CCD elements $D_1$ to $D_8$ are arranged along a main scanning direction X, and the CCD line sensor 13 relatively progresses along a subscanning direction Y.

Figure 4B:
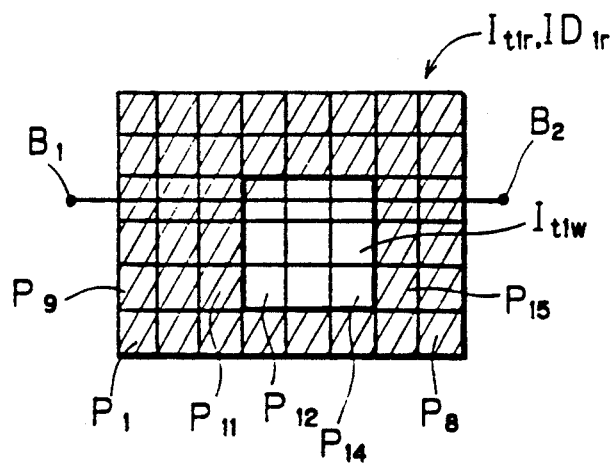
Figure 4C:
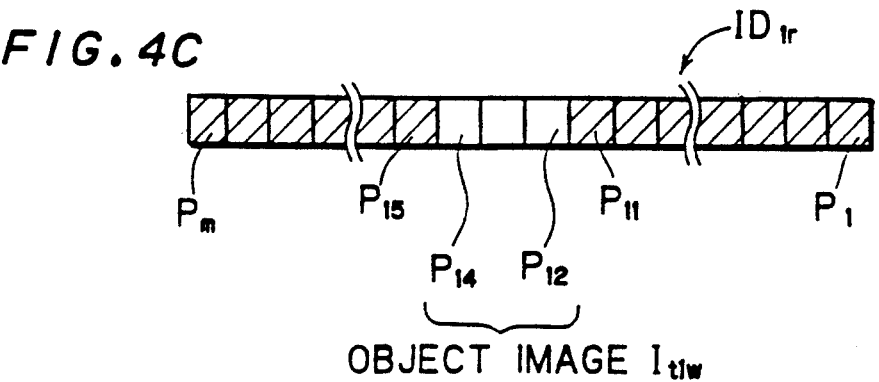

FIG. 4B shows a reference image $I_{t1r}$ which has no false image of the white part $O_{t1w}$ and includes only the true image $I_{t1w}$. Image data of such a reference image $I_{t1r}$ are obtained by measuring the shape, position and optical density of the white part $O_{t1w}$ in the test original $O_{t1}$ and the density of the black part $O_{t1b}$ at the step S1, as described above. Assuming that the reference image $I_{t1r}$ has been obtained by reading the test original $O_{t1}$ by the CCD line sensor 13, the image data of the reference image $I_{t1r}$ have such structure that pixels $P_1$ to $P_{11}$ are black, pixels $P_{12}$ to $P_{14}$ are white . . . , etc. Thus, image data $ID_{1r}$ (hereinafter referred to as "reference image data") of the reference image $I_{t1r}$ are also prepared according to this structure, as shown in FIG. 4C. In FIG. 4C, black parts are slanted lines similarly to FIGS. 4A and 4B and only pixels on the line $B_1$-$B_2$ in FIG. 4B are illustrated. As hereinabove described, the reference image data $ID_{1r}$ are stored in the memory 17a (see FIG. 1B) in the ghost correction data generating circuit 17 at the step S1.

In the examples shown in FIGS. 4A to 4F, it is assumed that data of the CCD elements $D_1$ to $D_8$ are serially transmitted to the A-D converter 14 (see FIG. 1A) as the CCD line sensor 13 progresses along the subscanning direction Y. Therefore, position coordinates of the respective pixels in the main scanning direction X and the subscanning direction Y are simultaneously designated by the numbers 1 to m of the pixels.

Figure 4D:
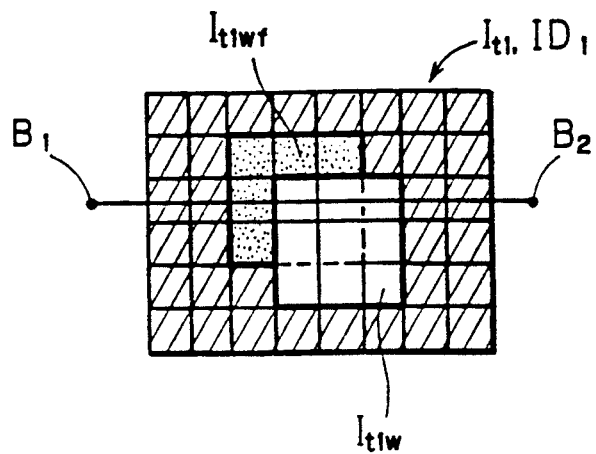
Figure 4E:
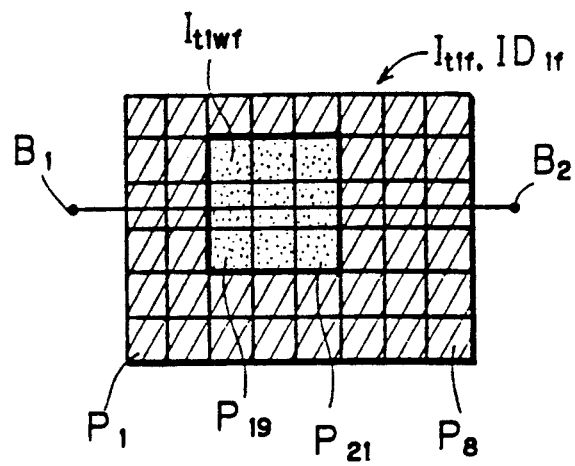

FIG. 4D shows an image $I_{t1}$ obtained by actually reading the test original $O_{t1}$ at the step S2. This image $I_{t1}$ includes the false image $I_{t1wf}$. The image $I_{t1f}$ including only the false image $I_{t1wf}$ as shown in FIG. 4E is obtained as follows:

$$I_{t1f} = I_{t1} - I_{t1r} \tag{1}$$

Using the image data, the equation (1) is rewritten as:

$$ID_{1f} = ID_1 - ID_{1r} \tag{2}$$

where $I_{t1f}$, $ID_{1f}$: an image and image data including only the false image $I_{t1wf}$, $I_{t1}$, $ID_1$: an image and image data including the false image $I_{t1wf}$ and the true image $I_{t1w}$, and $I_{t1r}$, $ID_{1r}$: a reference image and reference image data.

Figure 4F:
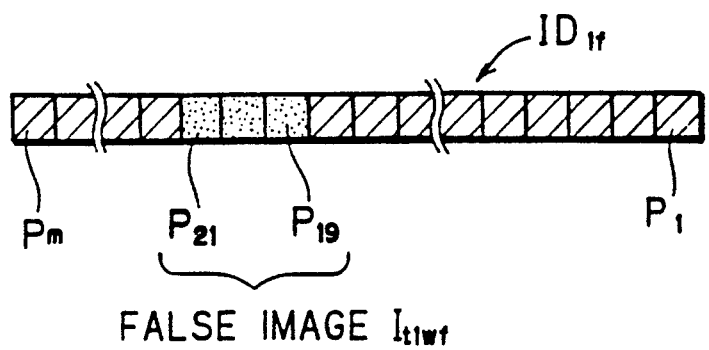
Figure 5A:
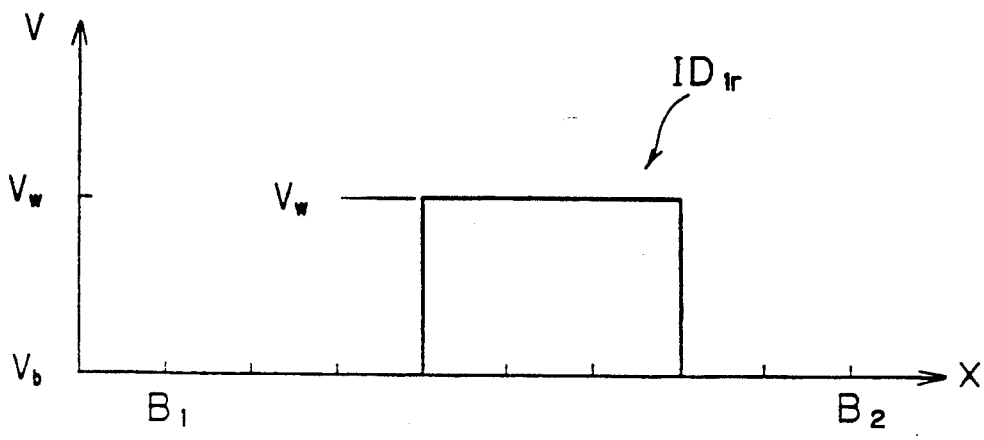
FIGS. 5A to 5C are diagrams showing distributions of image data of FIGS. 4B, 4D and 4E, respectively.
Figure 5B:
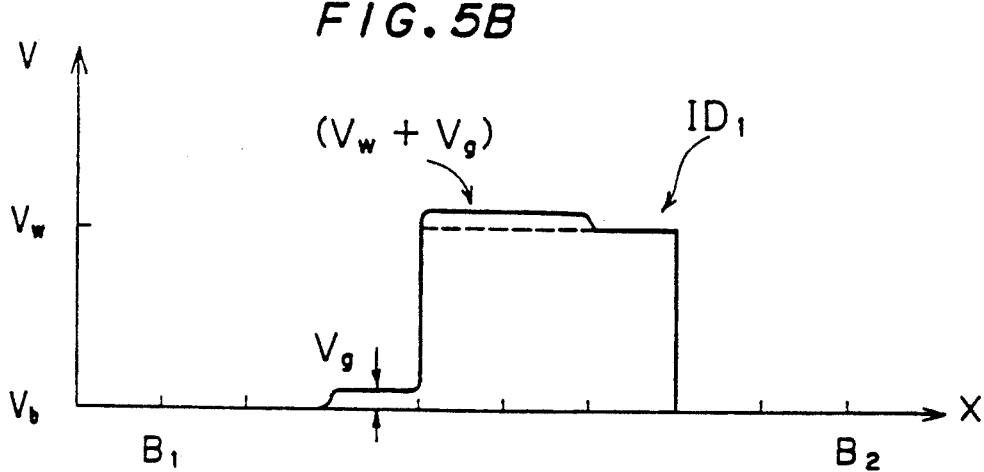
Figure 5C:
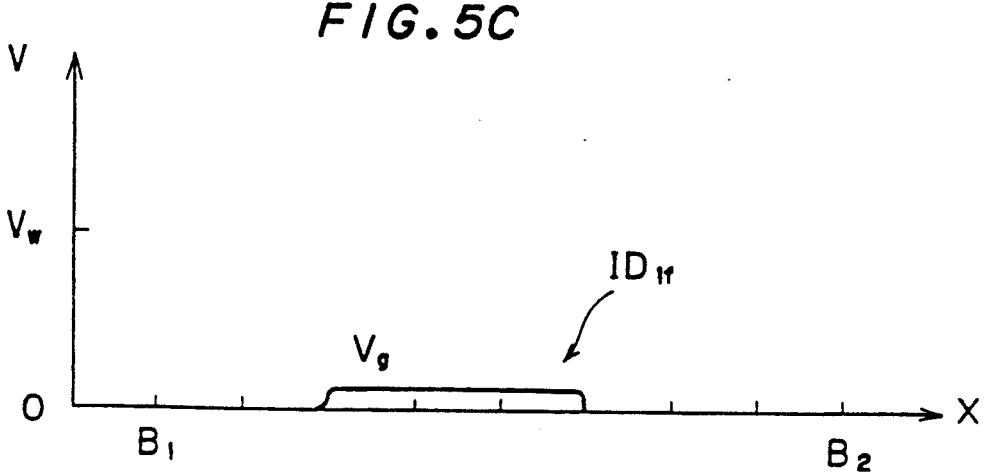

FIGS. 5A to 5C show distributions of the image data $ID_{1r}$, $ID_1$ and $ID_{1f}$ along the lines $B_1$-$B_2$ in FIGS. 4B, 4D and 4F respectively. In FIGS. 5A to 5C, the vertical axes represent levels of the image data corresponding to luminance. In the reference image data $ID_{1r}$ shown in FIG. 5A, only a specific image data level $V_W$ of the white part $O_{t1w}$ appears between the regions having a specific image data level $V_b$ of the black part $O_{t1b}$. In the image data $ID_1$ obtained by reading the test original $O_{t1}$, on the other hand, a constant level $V_g$ is added to the part of the false image $I_{t1wf}$. Therefore, the shape and the position of the false image $O_{t1wf}$ and the level $V_g$ of the image data $ID_{1f}$ can be obtained by calculating difference between the image data $ID_1$ and $ID_{1r}$ every pixel according to the equation (2). The difference in the equation (2) is calculated by a subtracter 17b shown in FIG. 1B. The image data $ID_{1f}$ obtained by the subtracter 17b is shown in FIG. 4F, where black parts are shown by oblique lines and parts of the false image are shown as matte portions.

Comparing FIG. 4C with FIG. 4F, it is understood that the position of the false image $I_{t1wf}$ rearwardly deviates by +7 pixels (=19−12) from the position of the true image $I_{t1w}$. The ghost detection circuit 17c shown in FIG. 1B obtains the amount and direction of this deviation, and the level ratio $V_w/V_g$ between the image data of the true image $I_{t1w}$ and the false image $I_{t1wf}$.

FIG. 1C is a block diagram showing the internal structure of the ghost detection circuit 17c in detail. The reference image data $ID_{1r}$ having been stored in the memory 17a are inputted in a first comparator 171 provided in the ghost detection circuit 17c, and compared with a prescribed first threshold value TH1. The first threshold value TH1 is set to be lower than the image data level $V_W$ of the white part and higher than the image data level of the black part. The first comparator 171 raises up its output signal $S_{11}$ to a high level as to only pixels whose reference image data $ID_{1r}$ have levels higher than the first threshold value TH1, i.e., the pixels in the white part. On the other hand, the image data $ID_{1f}$ of the false image obtained by the subtracter 17b are inputted in a second comparator 172 provided in the ghost detection circuit 17c, and compared with a prescribed second threshold value TH2. The second threshold value TH2 is set to be lower than the image data level $V_g$ of the false image and higher than the image data level $V_b$ of the black part. The values of the first and second threshold values TH1 and TH2 are empirically decided. The second comparator 172 raises up its output signal $S_{21}$ to a high level as to only pixels whose image data $ID_{1f}$ have levels higher than the second threshold value TH2, i.e., pixels corresponding to portions of the false image.

A data controller 173 receives the output signals $S_{11}$ and $S_{21}$ from the first and second comparators 171 and 172, and outputs three signals $S_{31}$, $S_{32}$ and $S_{gd}$. Among these signals, the signal $S_{31}$ rises to a high level when either one of the signals $S_{11}$ and $S_{21}$ rises to a high level, and falls to a low level when the other one of the signals $S_{11}$ and $S_{21}$ thereafter rises to a high level. A counter 174 receives this signal $S_{31}$, and counts the number of pixels for which the signal $S_{31}$ is at the high level. Then the counter 174 outputs a deviation quantity signal $S_{gp}$ indicating the number of pixels counted. The value of the deviation quantity signal $S_{gp}$ corresponds to the amount of spatical deviation between the false image $I_{t1f}$ and the true image $I_{t1w}$. The output signal $S_{gd}$ is a deviation direction signal indicating to which one of a positive direction (+) and a negative direction (−) the false image $I_{t1wf}$ deviates from the true image $I_{t1w}$. Namely, when the signal $S_{11}$ rises to a high level previous to the signal $S_{21}$ (such as the case shown in FIGS. 4A to 4F), the deviation direction signal $S_{gd}$ becomes a signal indicating (+) (for example, a high level signal). When the signal $S_{21}$ rises to a high level previous to the signal $S_{11}$, on the other hand, the shift direction signal $S_{gd}$ becomes a signal indicating (−) (for example, a low level signal). The signal $S_{32}$ goes high only when both of the two signals $S_{11}$ and $S_{21}$ are at high levels, and drives a divider 175 and an averaging circuit 176. The divider 175 divides the reference image data $ID_{1r}$ by the image data $ID_{1f}$ of the false image. The divider 175 operates only in pixels for which both of the signals $S_{11}$ and $S_{21}$ are high, i.e., such pixels that the true image $I_{t1w}$ and the false image $I_{t1wf}$ overlap with each other on the image $I_{t1}$ (see FIG. 4D). Therefore, its output signal $S_{51}$ represents the value of the ratio $V_W/V_g$ between the levels of the image data of the true image $I_{t1w}$ and the false image $I_{t1wf}$. The value of the signal $S_{51}$ is inputted in the averaging circuit 176, and averaged over respective pixels in the region where the true image $I_{t1w}$ and the false image $I_{t1wf}$ overlap with each other. It is possible to omit the averaging circuit 176. However, accuracy of the value of the level ratio $V_w/V_g$ of the image data is advantageously improved by averaging. An output signal $S_{gg}$ of the averaging circuit 176 is a gain signal representing an average value of the level ratio $V_w/V_g$ of the image data.

The values of the deviation quantity signal $S_{gp}$, the deviation direction signal $S_{gd}$ and the gain signal $S_{gg}$ obtained in the aforementioned manner form the ghost correction data.

At the step S4 in FIG. 2, the ghost correction data are stored in the ghost correction circuit 181. The values of the shift quantity signal $S_{gp}$ and the shift direction signal $S_{gd}$ are stored in an address controller 181a (see FIG. 1B). The value of the gain signal $S_{gg}$ is stored in a memory 181d. The step S4 may be carried out by an operator reading the values of the signals $S_{gp}$, $S_{gd}$ and $S_{gg}$ outputted from the ghost correction data generating circuit 17 and inputting these values in the ghost correction circuit 181 through a keyboard (not shown) or the like, for example. Alternatively, these values may be directly supplied from the ghost correction data generating circuit 17 to the ghost correction circuit 181 through an on-line communication.

At a step S5, an objective original to be reproduced is employed as the original 3 and the image thereof is read and recorded while performing ghost correction. At this time, the switching circuit 16 shown in FIGS. 1A and 1B is switched so that the image signal $V_N$ is supplied to the ghost correction circuit 181. FIG. 3(d) shows an exemplary original $O_a$ to be reproduced. This original $O_a$ includes a picture $O_m$ of a human figure. FIG. 3(e) shows an image $I_a$ obtained by reading the original $O_a$. This image $I_a$ includes a true image $I_m$ and a false image $I_{mg}$ (ghost) of the picture $O_m$ of the human figure. As shown in FIG. 1B, the image $I_a$ is supplied to the ghost correction circuit 181 as the image signal $V_N$, and stored in a line memory 181d. Further, the image signal $V_N$ is inputted in a divider 181c, and divided by the gain signal $S_{gg}$ ($=V_w/V_g$) which has been supplied from the memory 181b to the divider 181c. Due to such division, the level of an image signal of the image $I_a$ is entirely lowered, whereby the level of an image signal of the true image $I_m$ is lowered to the signal level of the false image $I_{mg}$. Further, the level of the image signal of the false image $I_{mg}$ is also lowered to a negligble degree. FIG. 3(f) shows an image $I_{ag1}$ whose signal level has been thus lowered. Image data of the image $I_{ag1}$ are stored in a line memory 181e. The address controller 181a stores the values of the deviation quantity signal $S_{gp}$ and the deviation direction signal $S_{gd}$, and shifts output timing of image data from the line memory 181d or 181e. For example, when the false image deviates toward a plus (+) side from the true image, i.e., to a larger pixel number side as shown in FIGS. 3 and 4A to 4F, the image data stored in the line memory 181e are outputted with a delay by the number of pixels indicated by the signal $S_{gp}$. An image $I_{ag2}$ thus outputted from the line memory 181e includes an image which is equivalent to the false image $I_{mg}$ of the image $I_a$, as shown in FIG. 3(g). A substrater 181f subtracts image data of the image $I_{ag2}$, supplied from the line memory 181e, from image data of the image $I_a$ supplied from the line memory 181d. As a result, an image $I_{aa}$, from which the false image $I_{mg}$ has been eliminated, is obtained as shown in FIG. 3(h). This image $I_{aa}$ is recorded on the photosensitive film 28.

As hereinabove described, it is possible to eliminate the false image called a ghost by obtaining the ghost correction data using the test original for a start and then processing the image signal $V_N$ by the ghost correction circuit storing the ghost correction data.

B. Flare Correction

Figure 6A:
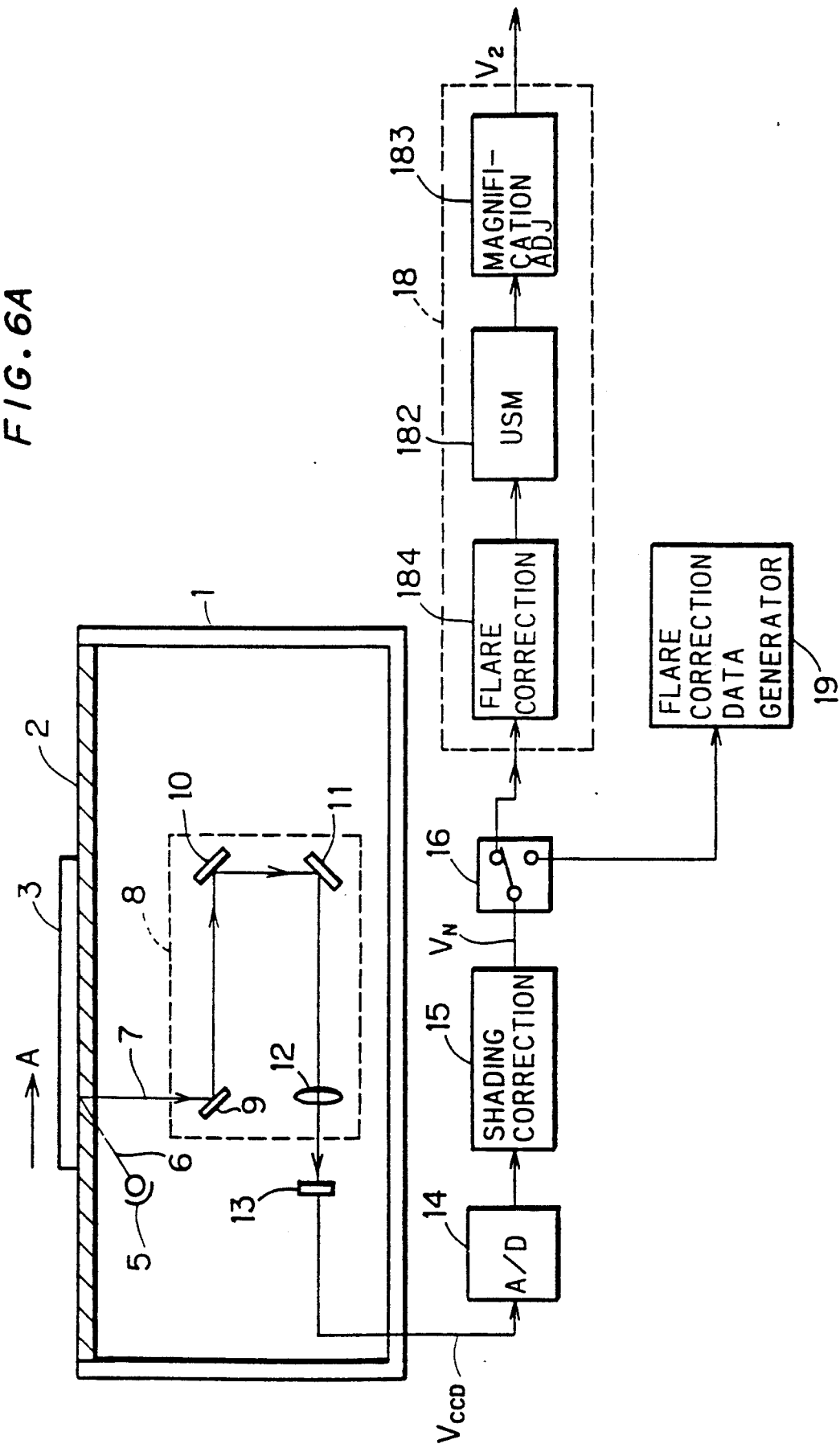
FIGS. 6A to 6C are block diagrams showing the structure of an apparatus according to a second preferred embodiment of the present invention, which is directed to flare elimination.
Figure 6A:
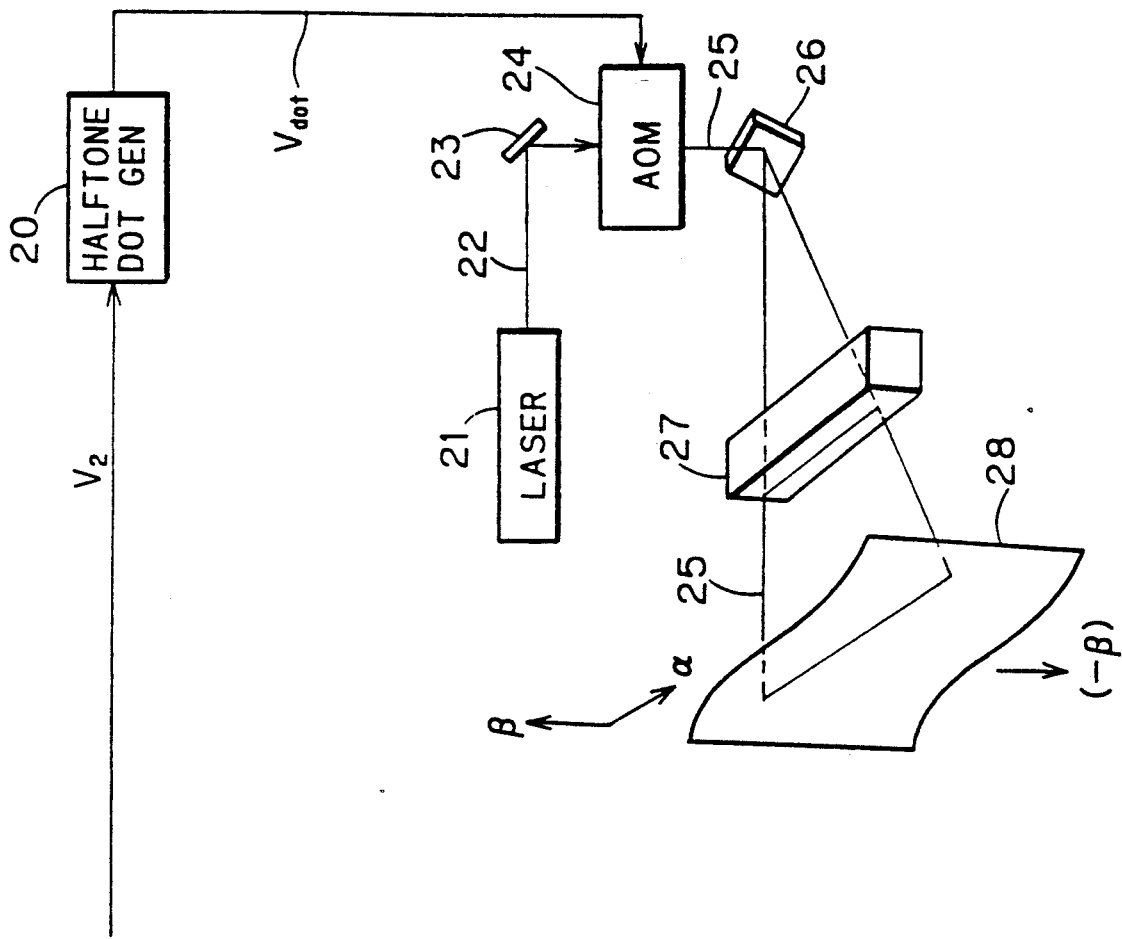

FIG. 6A is a schematic block diagram showing a scanning apparatus which eliminates a false image (flare) according to another preferred embodiment of the present invention. In this scanning apparatus, the ghost correction circuit 181 and the ghost correction data operating circuit 17 of the scanning apparatus shown in FIG. 1A are replaced by a flare correction circuit 184 and a flare correction data operating circuit 19, respectively. The flare is an unsharp false image like "haze" spreading around a true image. When a CCD line sensor is used, a flare in the main scanning direction mainly causes deterioration of picture quality.

Figure 6B:
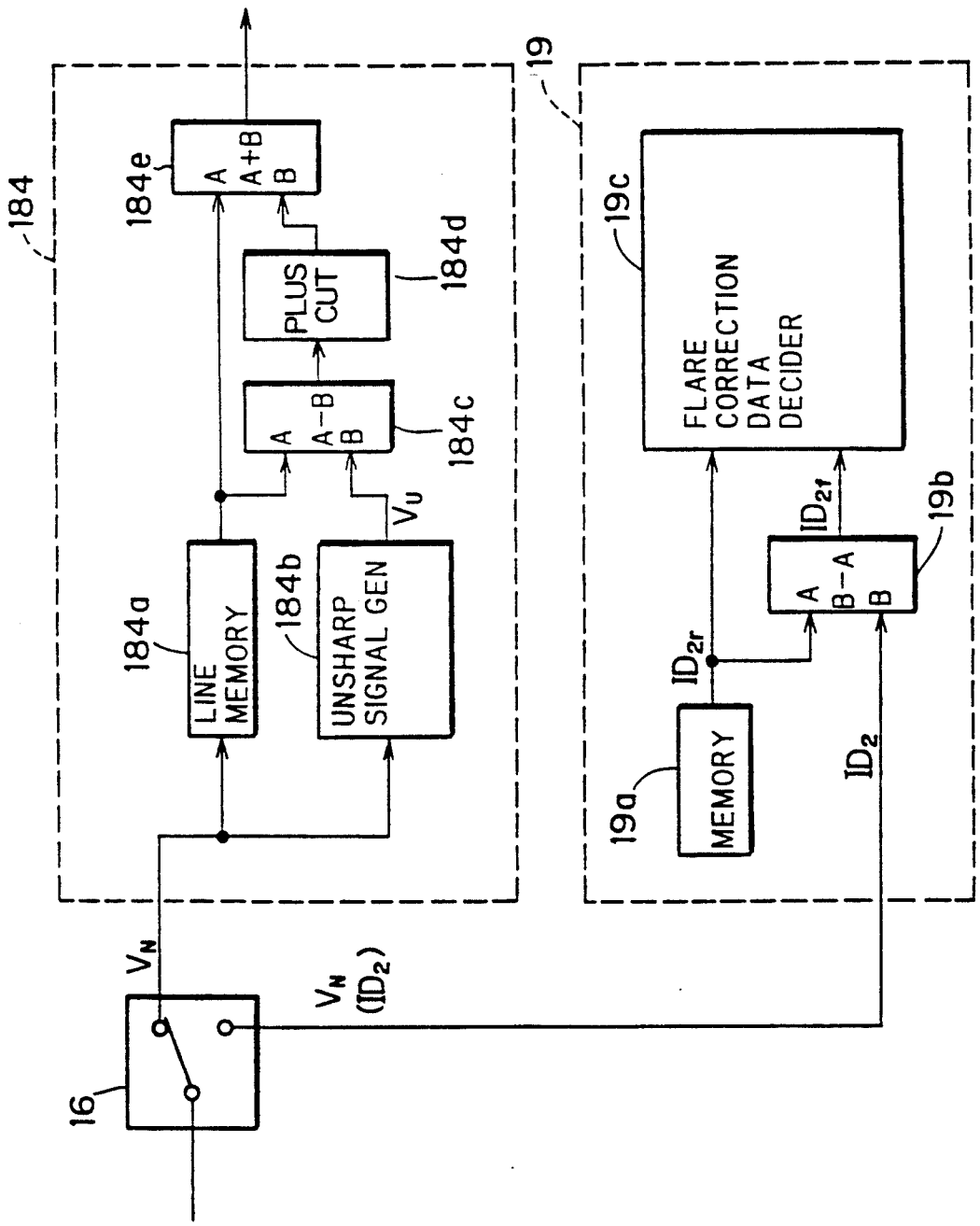

FIG. 6B is a block diagram showing internal structures of the flare correction circuit 184 and the flare correction data generating circuit 19. The flare correction data generating circuit 19 comprises a memory 19a, a subtracter 19b and a flare correction data decider 19c.

FIG. 7 is a flow chart showing the procedure of flare correction. FIGS. 8(a)-8(h) are conceptual diagrams showing exemplary images in this procedure.

Figure 9A:
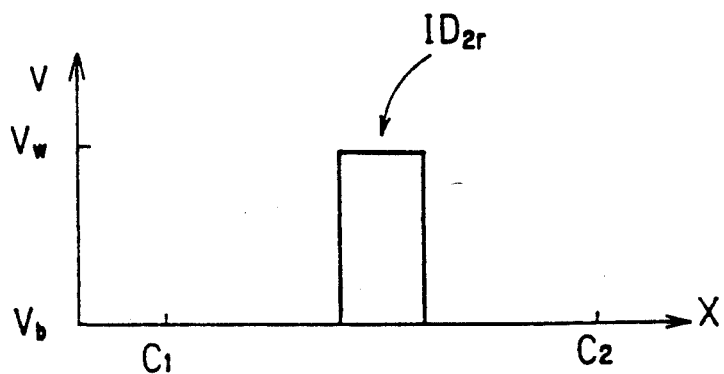
FIGS. 9A to 9C are diagrams showing distributions of image data of the images shown in FIG. 8, FIGS. 10A to 10D are diagrams showing a method of generating a flare correction signal in the second preferred embodiment.

First, a test original is prepared at a step S11. FIG. 8(a) shows an exemplary test original $O_{t2}$. This test original $O_{t2}$ may be identical to the test original $O_{t1}$ shown in FIG. 3(a). A reference image $I_{t2r}$ including no flare is previously provided on this test original $O_{t2}$ similarly to the case of ghost correction. FIG. 9A shows distribution of reference image data $ID_{2r}$ of the test original $O_{t2}$ in a direction $C_1$-$C_2$. The reference image data $ID_{2r}$ are stored in the memory 19a (see FIG. 6B) in the flare correction data generating circuit 19.

Figure 9B:
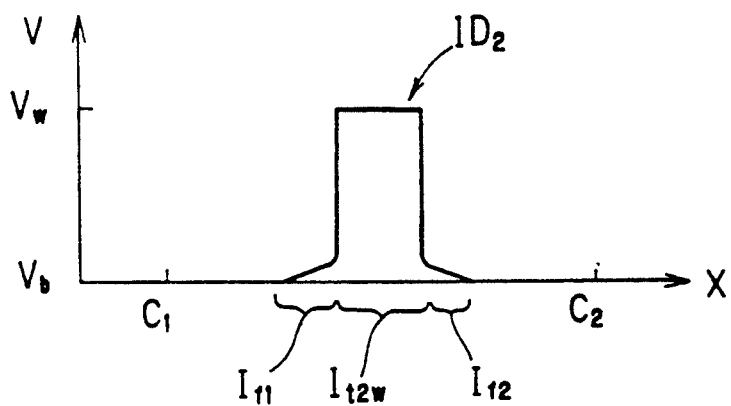

At a step S12, the test original $O_{t1}$ is photoelectrically read through the scanning apparatus shown in FIG. 6A. At this time, a switching circuit 16 shown in FIG. 6A is switched toward the flare correction data generating circuit 19, whereby an image signal $V_N$ is supplied to the flare correction data generating circuit 19. FIG. 8(b) shows an image $I_{t2}$ read at this time. This image $I_{t2}$ includes a true image $I_{t2w}$ corresponding to a white part $O_{t2w}$ of the test original $O_{t2}$ and false images (flares) $I_{f1}$ and $I_{f2}$ spreading therefrom along the main scanning direction X. In FIG. 8, it is assumed that there is no false image appearing in the form of a ghost. FIG. 9B shows distribution of image data $ID_2$ of the image $I_{t2}$ along the line $C_1$-$C_2$. The values of image data $ID_{t2}$ at the portions of the false images $I_{f1}$ and $I_{f2}$ by flares are considerably lower than a signal level $V_W$ of the white part $I_{t2w}$, and gradually lowered at positions deviated from the white part $I_{t2w}$.

The subtracter 19b obtains image data $ID_{2f}$ of an image $I_{t2f}$ including only flare components by the following subtraction (3):

$$ID_{2f} = ID_2 - ID_{2r} \qquad (3)$$

Figure 9C:
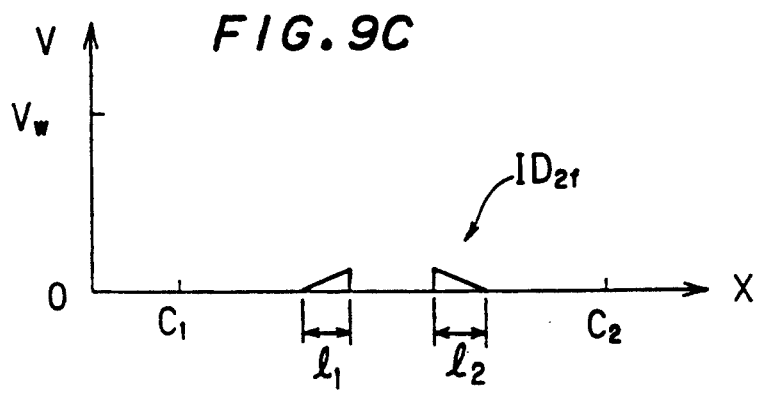

FIG. 8(c) shows an image $I_{t2f}$ obtained by this subtraction. FIG. 9C shows distribution of the image data $ID_{2f}$ along the line $C_1$-$C_2$.

The flare correction data decider 19c decides flare correction data on the basis of the reference image data $ID_{2r}$ and the image data $ID_{2f}$ including only the flare components. The flare correction data are data for obtaining a correction signal for eliminating only the flare components on the basis of the image data $ID_2$.

Before explaining a method of deciding the flare correction data, a correction method in the flare correction circuit 184 is now described. The flare correction circuit 184 eliminates the flare components through a method similar to digial sharpness enhancement processing.

Figure 10A:
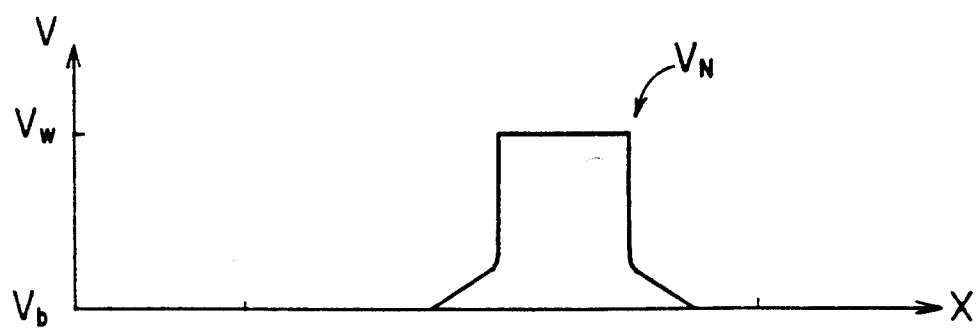

Referring to FIG. 6B, when an image signal $V_N$ for one main scanning line is supplied from the switching circuit 16 to the flare correction circuit 184, the value of this image signal $V_N$ is stored in a line memory 184a. FIG. 10A shows an exemplary image signal $V_N$ for one main scanning line. Referring to FIG. 10A, the horizontal axis represents main scanning coordinates, and the vertical axis represents levels of image signals.

Figure 6C:
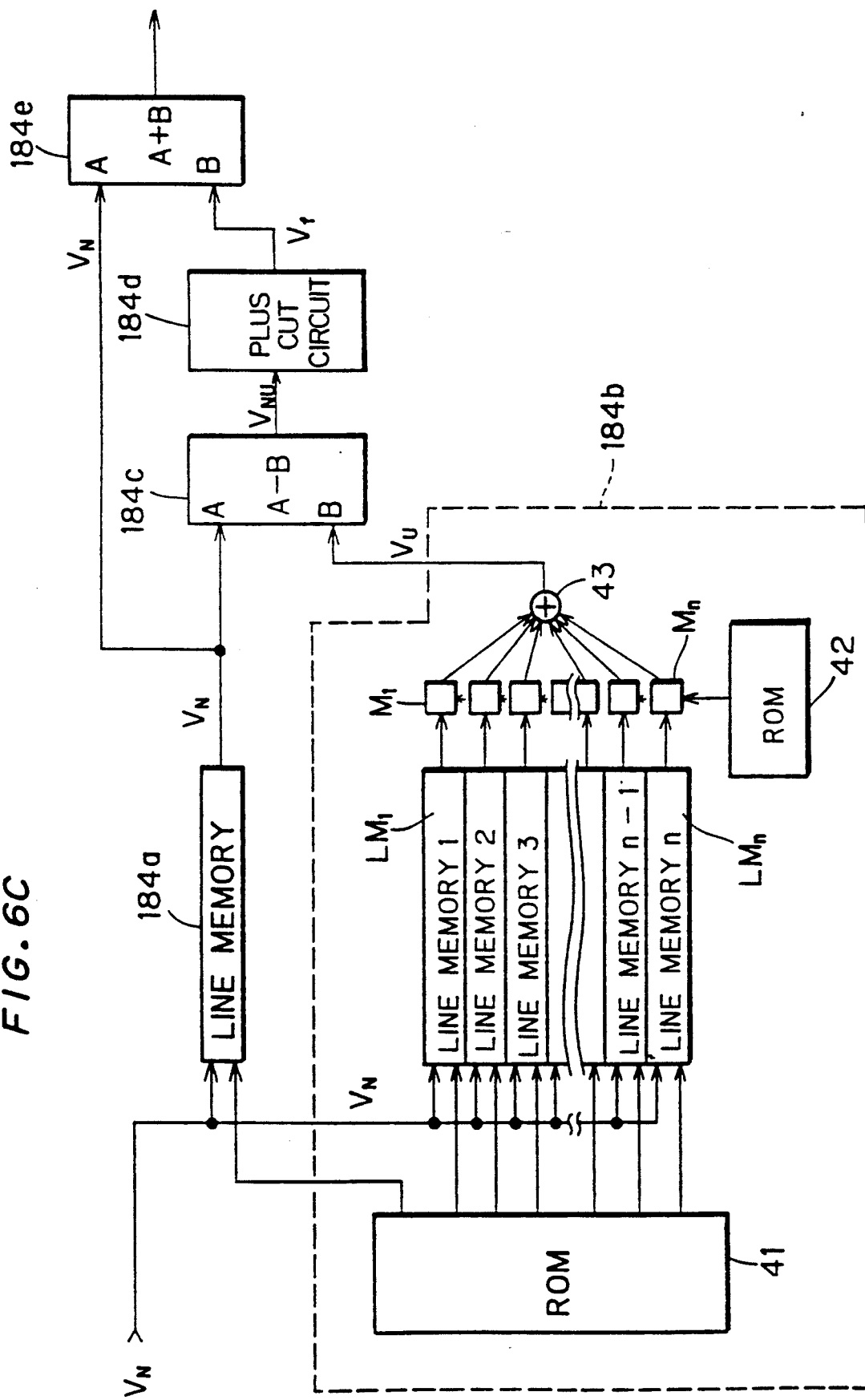
Figure 10B:
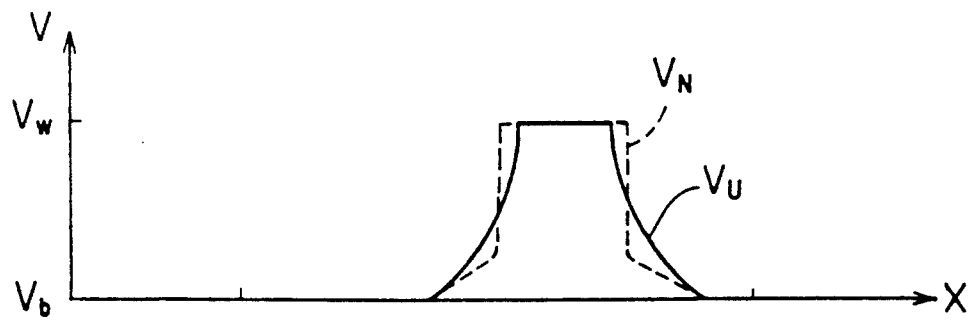

An unsharp signal generating part 184b generates an unsharp signal $V_U$ shown in FIG. 10B on the basis of the image signal $V_N$. FIG. 6C is a block diagram showing the internal structure of the flare correction circuit 184 in more detail. The unsharp signal generating part 184b comprises n line memories $LM_1$ to $LM_n$, n multipliers $M_1$ to $M_n$, two ROMs 41 and 42, and an adder 43, where n is a predetermined positive integer. The image signal $V_N$ expressing an image of one main scanning line is simultaneously inputted in the n line memories $LM_1$ to $LM_n$ in parallel and stored therein. In other words, the line memories $LM_1$ to $LM_n$ store the same image signal $V_N$, respectively. Each of the line memories $LM_1$ to $LM_n$ has capacity capable of storing the value of the image signal $V_N$ for one main scanning line.

The value of the image signal $V_N$ stored in each of the line memories $LM_1$ to $LM_n$ is outputted from each line memory at timing designated by the ROM 41. Weight coefficients a(i) (i=1 to n) which are previously determined are multiplied by the image signal $V_N$ in the multipliers $M_1$ to $M_n$, and thereafter added up in the adder 43. FIG. 11 shows exemplary weight coefficients a(i) used in the multipliers $M_1$ to $M_n$. Referring to FIG. 11, the horizontal axis represents the numbers i of the line memories $LM_1$ to $LM_n$. It is assumed here that n=7. A delay $\Delta X$ of output timing of each line memory is shown in correspondence to the number i of the line memory. For example, the value of a timing delay $\Delta X$ of the line memory $LM_5$ is +1, which indicates that the timing at which the image signal $V_N$ is outputted from the line memory $LM_5$ is later by one pixel than the timing at which the image signal $V_N$ is outputted from the line memory 184a. Such weight coefficients a(i) are supplied from the ROM 42 to the respective multipliers $M_1$ to $M_n$.

FIGS. 12(a)-12(h) are diagrams illustrating operations of the multipliers $M_1$ to $M_n$ and the adder 43. First, it is assumed that an image signal $V_N$ shown by broken lines in FIG. 12(h) is supplied to the line memories $LM_1$ to $LM_n$. FIG. 12(a) shows an image signal $a(1) \cdot V_N$ outputted from the line memory $LM_1$ and multiplied by the multiplier $M_1$. This image signal $a(1) \cdot V_N$ is a signal which is outputted at timing earlier by three pixels than the original image signal $V_N$. Similarly, FIGS. 12(b) to 12(g) show image signals $a(2) \cdot V_N$ to $a(7) \cdot V_N$ outputted from the line memories $LM_2$ to $LM_7$ and multiplied in the multipliers $M_2$ to $M_7$ respectively. In FIGS. 12(a)-12(g), flare components are omitted since signal values of the flare components are sufficiently reduced to negligble levels in general in these image signals multiplied by the coefficients a(i). FIG. 12(h) shows an unsharp signal $V_U$ which is obtained by adding up these image signals $a(1) \cdot V_N$ to $a(7) \cdot V_N$ in the adder 43. The central portion of the unsharp signal $V_U$ has the same level as the central portion of the original signal $V_N$, and this is a signal whose level is smoothly changed on both ends (step portions) of the original signal $V_N$. In order to obtain such an unsharp signal $V_U$, the coefficients a(i) may be decided to satisfy the following condition:

$$\sum_{i=1}^{n} a(i) = 1 \quad (4)$$

The unsharp signal $V_U$ shown in FIG. 10B can be generated in a similar manner to the unsharp signal $V_U$ shown in FIG. 12. Referring to FIG. 10B, foot portions of the unsharp signal $V_U$ are shown by curves for the purpose of simplification.

Figure 10C:
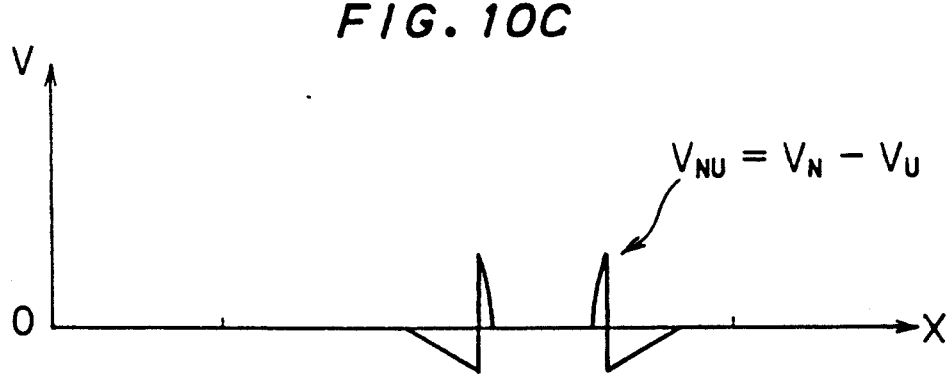
Figure 10D:
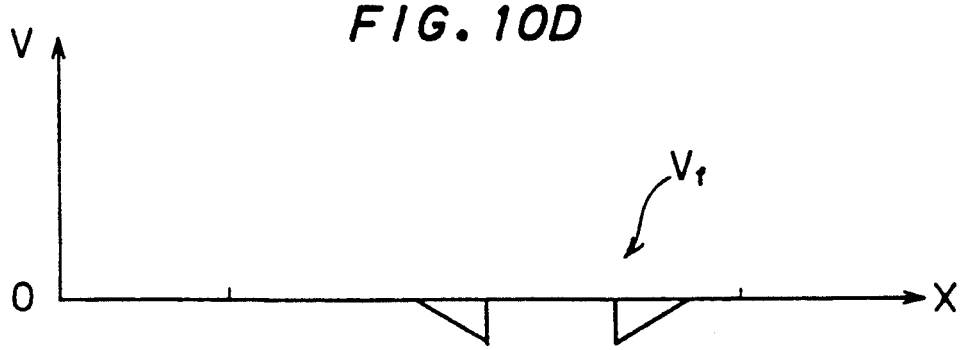

A subtracter 184c shown in FIG. 6C subtracts the unsharp signal $V_U$ from the original image signal $V_N$ which is supplied from the line memory 184a, to obtain a difference signal $V_{NU}$ shown in FIG. 10C. The difference signal $V_{NU}$ is supplied to a plus cut circuit 184d so that a plus component is cut or removed and only a minus component is left. Namely, when the difference signal $V_{NU}$ is divided into two signal parts having different signs, only a signal part $V_f$ which is present on an outer periphery side of an image represented by the image signal $V_N$ is left. Thus obtained is a flare correction signal $V_f$ shown in FIG. 10D. This flare correction signal $V_f$ is substantially equal in level distribution to a flare component of the original image signal $V_N$, and inverted in sign. Therefore, it is possible to eliminate the flare component from the image signal $V_N$ by adding the original image signal $V_N$ to the flare correction signal $V_f$ in an adder 184e. It is to be noted that the addition of the signals $V_f$ and $V_N$ is substantially identical to subtraction of the signal $(-V_f)$ representing the flare image from the image signal $V_N$.

In the aforementioned method of flare correction, the flare correction data are formed by the values of the weight coefficients a(i) stored in the ROM 42 and output timing data (i.e., the amount $\Delta X$ of deviation in FIG. 11) stored in the ROM 41. Namely, the flare correction data are distribution of the weight coefficients a(i).

The flare correction data decider 19c shown in FIG. 6B decides the distribution of the weight coefficients a(i) as the correction data. This decision may be made by an operator inputting the distribution of the weight coefficients a(i) in the flare correction data decider 19c through a keyboard (not shown) or the like and simulating the aforementioned correcting operation in the flare correction circuit 184. Namely, the flare correction data decider 19c geneates a flare correction signal from either one of the reference image data $ID_{2r}$ (see FIG. 9A) or the image data $ID_2$ on the basis of the inputted distribution of the weight coefficients a(i). The operator may adjust the distribution of the weight coefficients a(i) so that the flare correction signal becomes a signal which is inverted in sign to and substantially identical in level distribution to the flare components $ID_{2f}$ shown in FIG. 9C. In this case, a personal computer or the like can be used as the flare correction data decider 19c. If lengths $l_1$ and $l_2$ (FIG. 9C) of the flare components $ID_{2f}$ along the main scanning direction X are different from each other on both sides of the white part, flare correction data may be obtained so that a longer one of the flare components can be eliminated.

The distribution of the weight coefficients a(i) as flare correction data may be automatically decided by the flare correction data decider 19c on the basis of the reference image data $ID_{2r}$ and the image data $ID_{2f}$ having only the flare components. In this case, the level distribution in the unsharp signal $V_U$ may be first calculated from the image data $ID_{2f}$ having only the flare components, to obtain distribution of the weight coefficients a(i) providing the unsharp signal $V_U$. There is a correlation between the level distribution of the unsharp signal $V_U$ and the distribution of the weight coefficients a(i). Namely, the lelvel distribution of the unsharp signal $V_U$ in FIG. 12(h) is similar to the distribution of an accumulated value $\Sigma a(i)$ of the weight coefficients a(i), where the symbol $\Sigma$ represents a summation for i. It is possible to automatically obtain flare correction data by formulating such correlation and previously inputting the result in the flare correction data decider 19c.

The aforementioned method of generating an unsharp signal is identical to a method of generating an unsharp mask signal in digital sharpness enhancement processing (hereinafter referred to as "digital USM"). In the digital USM, the weight coefficients a(i) are called "mask weighting", and the number n of the coefficients a(i) is called as a mask size.

At a step S14 in FIG. 7, the flare correction data are stored in the flare correction circuit 184. According to this embodiment, many steps of the values of weight coefficients a(i) are previously written in the ROM 42, and addresses of data to be delivered from the ROM 42 to the respective multiplier circuits $M_1$ to $M_n$ are selectively designated, thereby substantially selecting one of the sets of the weight coefficients a(i). The ROM 42 may be provided with functions of the multiplier circuits $M_1$ to $M_n$, to omit the multiplier circuits $M_1$ to $M_n$. In this case, results $a(i) \cdot V_N$ of multiplication of the weight coefficients a(i) and the image signal $V_N$ may be previously written in the ROM 42. The respective line memories $LM_1$ to $LM_n$ supply the image signal $V_N$ as an address to the ROM 42, thereby outputting the written results of multiplication. The processing speed can be advantageously increased since no operation is required for multiplication. The ROM 41 previously stores many sets of values of output timing data, and the width (mask size) of distribution of the weight coefficients a(i) can be selected by designating addresses of the timing data which is to be delivered from the ROM 41 to the respective line memories $LM_1$ to $LM_n$.

At a step S15, an objective original to be reproduced is employed as an original 3, and image reading and image recording are conducted while performing flare correction. At this time, the switching circuit 16 shown in FIGS. 6A and 6B is switched toward the flare correction circuit 184. FIG. 8(d) shows an exemplary original $O_b$ to be reproduced. This original $O_b$ includes a picture $O_m$ of a human figure. FIG. 8(e) shows an image $I_b$ obtained by reading the original $O_b$. Appearing in this image $I_b$ are an image $I_m$ of the human figure and flare images $I_{mf1}$ and $I_{mf2}$ on both sides thereof along the main scanning direction. An image signal $V_N$ of the image $I_b$ is supplied to the flare correction circuit 184, so that an image signal (flare correction signal) $V_f$ of an image including only flare components is generated, as already described in relation to FIGS. 10A to 10D. Then, the flare components are eliminated from the original image signal $V_N$. FIG. 8(f) shows an image $I_{bf}$ which is expressed by the flare correction signal $V_f$ genetated in the flare correction circuit 184. Further, FIG. 8(g) shows an image $I_{bb}$ from which the flare components have been eliminated. This image $I_{bb}$ is recorded on a photosensitive film 28.

As hereinabove described, it is possible to eliminate flare components of the image by first obtaining the flare correction data using the test original and processing the image signal $V_N$ by the flare correction circuit storing the flare correction data.

C. Modifications (1) Although the above embodiments have been described for monochromatic images, the present invention is also applicable to color images. When ghost correction or flare correction is performed with respect to a color image, ghost correction data or flare correction data may be obtained for each of color separation signals R, G and B, to perform correction for each of the color separation signals R, G and B.

(2) The ghost correction data operating circuit 17 and the flare correction data operating circuit 19 may be provided as external devices which are not mounted in the scanning apparatus.

(3) The ghost correction data include the amount of deviation (pixel number) of the false image from the true image and the deviation direction, in the first preferred embodiment. However, these data may be data of other formats so far as the same are data indicating positional relation between the true image and the false image. For example, the ghost correction data may be so formed as to define the direction and amount of deviation in each of the main scanning direction and the subscanning direction.

(4) The unshapr signal may be generated by using a digital USM circuit in place of the unsharp signal creating part 184b in the flare correction circuit 184. In this case, the mask size and the mask weighting are supplied to the digital USM circuit as flare correction data. A processing method of digital USM is described in detail in Japanese Patent Laying-Open Gazette No. 59-141871/1984, for example.

(5) The flare correction may be performed along the subscanning direction in addition to or in place of the main scanning direction.

(6) When both of a ghost and a flare appear in a read image, it is preferred that clearer one of the ghost and the flare is first corrected in the aforementioned procedure, and then the other one is corrected. In consideration of such case, the scanning apparatus may be provided with both of the ghost correction circuit 181 and the flare correction circuit 184.

D. Conclusion

According to the present invention, a false image can be easily eliminated from an image read through an image reader since positional relation and density ratio between the true image and the false image are previously obtained using a reference original for eliminating the false image included in an arbitrary objective image on the basis of the positional relation and density ratio.

Furthermore, according to the present invention, a false image can be easily eliminated from an image read through an image reader since correction data are previously obtained from relation of density distribution of the true image and the false image using the reference image for eliminating a false objective image included in an arbitrary image on the basis of the correction data.

Although the present invention has been described and illustrated in detail, it is clearly understood that the same is by way of illustration and example only and is not to be taken by way of limitation. The spirit and scope of the present invention should be limited only by the terms of the appended claims.

I claim:

1. A method of eliminating, from objective image data obtained by photoelectrically reading an objective original on which an object is represented as an objective image, a false image having the same shape as a true image of said object and appearing at a position deviating from said true image, said method comprising the steps of:

(a) inputting reference image data from a data input device and storing said reference image data which is represented by an electric signal and expresses a reference image which includes only a true image of a reference object having a predetermined shape and a predetermined optical level;

(b) photoelectrically reading a reference original on which said reference image is represented with an image reader to obtain a first image data expressing said true image of said reference object and a false image of said reference object;

(c) reading said reference image data out of said memory and calculating a difference between said first image data and said reference image data to obtain second image data expressing only said false image of said reference object;

(d) comparing said second image data with said reference image data to obtain a positional deviation and an optical level ratio between respective images represented by said second image data and said reference image data;

(e) photoelectrically reading, with said image reader, an objective original having thereon only a true image of an object to obtain third image data expressing said true image of said object and a false image of said object;

(f) providing to said third image data said positional deviation and an optical density reduction corresponding to said optical level ratio to thereby obtain fourth image data expressing an image substantially including only said false image of said object; and (g) subtracting said fourth image data from said third image data to eliminate said false image of said object from an image expressed by said third image data to thereby obtain fifth image data expressing a fifth image which substantially includes only said true image of said object.

2. The method of claim 1, wherein:
the step of (d) includes the steps of:
(d-1) specifying a first area of an image expressed by said first image data on which only said false image of said reference object appears; and
(d-2) detecting a width of said first area to obtain said positional deviation.

3. The method of claim 2, wherein:
the step (d) further includes the steps of:
(d-3) specifying a second area of said image expressed by said first image data on which both of said true image and said false image of said reference image overlap with each other; and
(d-4) dividing an optical density level expressed by said reference image data by an optical level expressed by said second image data for at least one pixel located at a position corresponding to said second area, to thereby obtain said optical level ratio.

4. The method of claim 3, wherein:
the step (d-4) includes the steps of:
dividing an optical level expressed by said reference image data by said optical level expressed by said second image data for each one of a plurality of pixels located at positions corresponding to said second area to obtain a plurality of optical level ratios; and
averaging said plurality of optical level ratios to obtain said optical level ratio.

5. The method of claim 4, wherein:
the step (f) includes the steps of:
(f-1) dividing an optical level expressed by said third image data by said optical level ratio for each pixel to obtain image data having reduced optical levels; and
(f-2) providing said positional deviation to said image data having reduced optical levels to thereby obtain said fourth image data.

6. A method of eliminating, from objective image data obtained by photoelectrically reading an objective original on which an object is represented as an objective image, a false image appearing around a true image of said object, said method comprising the steps of:
(a) inputting reference image data from a data input device and storing said reference image data in a memory, wherein said reference image data is represented by an electric signal and expresses a reference image which includes only a true image of a reference object having a predetermined shape and a predetermined optical level;
(b) photoelectrically reading a reference original on which said reference image is represented with an image reader to obtain first image data expressing said true image of said reference object and a false image of said reference object;
(c) reading said reference image data out of said memory and calculating a difference between said first image data and said reference image data to obtain second image data expressing only said false image of said reference object;
(d) obtaining a relation between an optical level distribution on said true image of said reference object and an optical level distribution on said false image included in an image represented by said second image data, to thereby define a conversion rule applicable to convert an arbitrary optical level distribution into another optical level distribution;
(e) photoelectrically reading, with said image reader, an objective original having thereon only a true image of an object to obtain third image data expressing said true image of said object and a false image of said object;
(f) applying said conversion rule to an optical level distribution on said image expressed by said third image data to thereby convert said third image data into fourth image data expressing substantially only said false image of said object; and
(g) subtracting said fourth image data from said third image data to eliminate said false image of said object from said image expressed by said third image data to thereby obtain fifth image data which expresses substantially only said true image of said object.

7. The method of claim 6, wherein:
the step (d) includes the step of:
(d-1) determining coefficients so that said optical level distribution on said false image included in said image expressed by said second image data can be obtained by multiplying said optical level distribution on said true image of said reference object represented by said reference image data by said coefficients for each pixel; and
(d-2) representing said conversion rule in a form of numerical data representing respective values of said coefficients and respective positions of pixels on which said coefficients are defined.

8. The method of claim 7, wherein:
the step (d-1) includes the step of:
determining said coefficients so that a summation of said coefficients is equal to a predetermined value.

9. The method of claim 8, wherein:
the step (f) includes the steps of:
(f-1) multiplying said optical level distribution on said image expressed by said third image data by said coefficients for each pixel to obtain an unsharp image data expressing an unsharp image;
(f-2) obtaining difference image data expressing a difference image between said image expressed by said third image data and said unsharp image; and
(f-3) modifying said difference image data to thereby obtain said fourth image data.

10. The method of claim 9, wherein:
the step (f-3) includes the step of:
limiting respective optical levels on said difference image expressed by said difference image data with a predetermined constant level to thereby obtain said fourth image data in a negative representation of optical levels; and
the step (g) includes the step of:
adding said fourth image data in said negative representation to said third image data to obtain said fifth image data.

11. An apparatus for eliminating, from an objective image data obtained by photoelectrically reading an objective original on which an object is represented as an objective image, a false image having the same shape as a true image of said object and appearing at a position deviating from said true image, comprising:

(a) means for storing reference image data expressing a reference image which includes only a true image of a reference object having a predetermined shape and a predetermined optical level;

(b) means for inputting first image data expressing a first image which is obtained by photoelectrically reading a reference original having said reference image thereon and which includes said true image of said reference object and a false image of said reference object;

(c) means for calculating a difference between said first image and said reference image data to obtain second image data expressing a second image including only said false image of said reference object;

(d) means for comparing said second image data with said reference image data to obtain a positional deviation and an optical level ratio between said second image and said reference image respectively represented by said second image data and said reference image data;

(e) means for inputting third image data expressing a third image which is obtained by photoelectrically reading an objective original having thereon only a true image of an object and which includes said true image of said object and a false image of said object;

(f) means for providing to said third image data said positional deviation and an optical density reduction corresponding to said optical level ratio to thereby obtain fourth image data expressing a fourth image substantially including only said false image of said object; and (g) means for substracting said fourth image data from said third image to eliminate said false image of said object from said third image to thereby obtain fifth image data expressing a fifth image which substantially includes only said true image of said object.

12. The apparatus of claim 11, wherein;
said means (d) includes:
(d-1) means for specifying a first area of said first image on which only said false image of said reference object appears; and
(d-2) means for detecting a width of said first area to obtain said positional deviation.

13. The apparatus of claim 12, wherein said means (d) further includes:
(d-3) means for specifying a second area of said first image on which both of said true image and said false image of said reference image overlap with each other; and
(d-4) means for dividing an optical density level expressed by said reference image data by an optical level expressed by said second image data for at least one pixel located at a position corresponding to said second area, to thereby obtain said optical level ratio.

14. The apparatus of claim 13, wherein:
said means (d-4) further includes:
means for dividing an optical level expressed by said reference image data by said optical level of said second image data for each one of a plurality of pixels located at positions corresponding to said second area to obtain a plurality of optical level ratio; and
means for averaging said plurality of optical level ratios to obtain said optical level ratio.

15. The apparatus of claim 14, wherein:
said means (f) includes:
(f-1) means for dividing an optical level expressed by said third image data by said optical level ratio for each pixel to obtain image data having reduced optical levels; and
(f-2) means for providing said positional deviation to said image data having reduced optical levels to thereby obtain said fourth image data.

16. An apparatus for eliminating, from objective image data obtained by photoelectrically reading an objective original on which an object is represented as an objective image, a false image appearing around a true image of said object, comprising:

(a) means for storing reference image data expressing a reference image which includes only a true image of a reference object having a predetermined shape and a predetermined optical level;

(b) means for inputting first image data expressing a first image which is obtained by photoelectrically reading a reference original having said reference image thereon and which includes said true image of said reference object and a false image of said reference object;

(c) means for calculating a difference between said first image data and said reference image data to obtain second image data expressing a second image including only said false image of said reference object;

(d) means for obtaining a relation between an optical level distribution on said true image of said reference object and an optical level distribution on said false image included in said second image to define a conversion rule applicable to convert an arbitrary optical level distribution into another optical level distribution;

(e) means for inputting third image data expressing a third image which is obtained by photoelectrically reading an objective original having thereon only a true image of an object, said third image including said true image of said object and a false image of said object;

(f) means for converting optical level distribution on said third image through said conversion rule to thereby convert said third image data into fourth image data expressing a fourth image substantially including only said false image of said object; and (g) means for subtracting said fourth image data from said third image data to eliminate said false image of said object from said third image to thereby obtain fifth image data expressing a fifth image which substantially includes only said true image of said object.

17. The apparatus of claim 16, wherein:
said means (d) includes:
(d-1) means for determining coefficients so that said optical level distribution on said false image included in said second image can be obtained by multiplying said optical level distribution on said true image of said reference object by said coefficients for each pixel; and
(d-2) means for holding said conversion rule in a form of numerical data representing respective values of said coefficients and respective positions of pixels on which said coefficients are defined.

18. The apparatus of claim 17, wherein:

said means (f) includes:
(f-1) means for multiplying said optical level distribution on said third image by said coefficients for each pixel to obtain an unsharp image signal representing an unsharp image;
(f-2) means for obtaining difference image data expressing a difference image between said third image and said unsharp image; and
(f-3) means for modifying said difference image data to thereby obtain said fourth image data.

19. The apparatus of claim 18, wherein:
said means (f-3) includes:
means for limiting respective optical levels on said difference image expressed by said difference image data with a predetermined constant level to thereby obtain said fourth image data in a negative representation of optical levels; and
said means (g) includes:
means for adding said fourth image data in said negative representation to said third image data to obtain said fifth image data.

20. The method of claim 10, wherein said step of limiting comprises performing a plus-cut process on said difference image data.

21. The method of claim 9, wherein said step of modifying comprises deleting a part of said difference image data to thereby obtain said fourth image data.

22. The method of claim 8, wherein said predetermined value is 1, whereby said step of determining comprises setting said coefficients so that a summation of said coefficients is equal to one.

23. A method of eliminating a false image from an object-image of an object imaged by a photoelectric imaging device comprising the steps of:
processing object-image data provided by the photoelectric imaging device and representing the object-image to obtain false-image object data representing a false-image of the object,
subtracting the false-image object data from the object-image data to provide true-image object data representing a true-image of the object, thereby removing a residual false-image generated by the photoelectric imaging device,
wherein said step of processing object-image data includes the steps of:
using a separate imaging device to input true-image reference data representing a true-image of a reference object,
using the photoelectric imaging device to input reference-image data representing a reference-image of the reference object, said reference-image data including true-image reference data and false-image reference data generated by the photoelectric imaging device,
identifying a relationship between said true-image reference data and said reference-image data, and
using said relationship between said true-image reference data and said reference-image data to obtain said false-image object data.

* * * * *